US011297178B2

(12) United States Patent
Ferguson et al.

(10) Patent No.: US 11,297,178 B2
(45) Date of Patent: *Apr. 5, 2022

(54) METHOD, APPARATUS, AND COMPUTER-READABLE MEDIA UTILIZING RESIDUAL ECHO ESTIMATE INFORMATION TO DERIVE SECONDARY ECHO REDUCTION PARAMETERS

(71) Applicant: Nureva, Inc., Calgary (CA)

(72) Inventors: Richard Dale Ferguson, Okotoks (CA); Linshan Li, Calgary (CA); Mahdi Javer, Calgary (CA); Nicholas Alexander Norrie, Calgary (CA)

(73) Assignee: NUREVA, INC.

( * ) Notice: Subject to any disclaimer, the term of this patent is extended or adjusted under 35 U.S.C. 154(b) by 0 days.

This patent is subject to a terminal disclaimer.

(21) Appl. No.: 17/130,951

(22) Filed: Dec. 22, 2020

(65) Prior Publication Data

US 2021/0112157 A1    Apr. 15, 2021

Related U.S. Application Data

(63) Continuation of application No. 16/407,636, filed on May 9, 2019, now Pat. No. 10,880,427.

(Continued)

(51) Int. Cl.
*H04M 3/00* (2006.01)
*H04M 3/56* (2006.01)
*H04M 9/08* (2006.01)

(52) U.S. Cl.
CPC .......... *H04M 3/002* (2013.01); *H04M 3/568* (2013.01)

(58) Field of Classification Search
CPC ....... H04M 3/002; H04M 3/568; H04M 9/082
(Continued)

(56) References Cited

U.S. PATENT DOCUMENTS 4,998,241 A    3/1991   Brox et al.
6,175,602 B1   1/2001   Gustafsson et al.
(Continued)

OTHER PUBLICATIONS

International Search Report and Written Opinion dated Jul. 26, 2019, from International Application No. PCT/CA2019/050621, 8 sheets.

(Continued)

*Primary Examiner* — Thjuan K Addy
(74) *Attorney, Agent, or Firm* — Katten Muchin Rosenman LLP

(57) ABSTRACT

Method, apparatus, and program code embodied in computer-readable media, for providing enhanced echo suppression in a conferencing system having at least one microphone and at least one speaker. At least one microphone input signal is received, and at least one speaker input signal is provided. At least one processor has at least one primary echo-suppressor and at least one secondary echo-suppressor. The at least one primary echo-suppressor receives (i) the microphone input signal(s) and (ii) the speaker input signal(s). The at least one primary echo-suppressor provides at least one echo-suppressed microphone signal. The at least one secondary echo-suppressor receives the at least one echo-suppressed microphone signal and provides an output signal. The at least one processor provides the at least one echo-suppressed microphone signal to the at least one secondary echo-suppressor without providing the at least one speaker input signal directly to the at least one secondary echo-suppressor.

19 Claims, 18 Drawing Sheets

Related U.S. Application Data

(60) Provisional application No. 62/669,020, filed on May 9, 2018.

(58) Field of Classification Search
USPC ............ 379/202.01, 201.01, 207.02, 406.01, 379/406.03, 406.05, 406.04, 392, 392.01
See application file for complete search history.

(56) References Cited

U.S. PATENT DOCUMENTS

| | | | |
|---|---|---|---|
| 6,459,914 | B1 | 10/2002 | Gustafsson et al. |
| 6,487,257 | B1 | 11/2002 | Gustafsson et al. |
| 6,507,623 | B1 | 1/2003 | Gustafsson et al. |
| 6,717,991 | B1 | 4/2004 | Gustafsson et al. |
| 6,859,531 | B1 | 2/2005 | Deisher |
| 6,925,176 | B2 | 8/2005 | Myllylae et al. |
| 7,813,499 | B2 | 10/2010 | Chhetri et al. |
| 8,275,120 | B2 | 9/2012 | Stokes, III et al. |
| 8,385,557 | B2 | 2/2013 | Tashev et al. |
| 8,693,678 | B2 | 4/2014 | Lindstrom et al. |
| 8,892,431 | B2 | 11/2014 | Gerkmann et al. |
| 8,903,722 | B2 | 12/2014 | Jeub et al. |
| 9,172,816 | B2 * | 10/2015 | Ahgren ................. H04M 9/082 |
| 9,277,059 | B2 * | 3/2016 | Ahgren ................. H04M 9/082 |
| 9,473,646 | B1 | 10/2016 | Chhetri |
| 2004/0264686 | A1 | 12/2004 | Enzner |
| 2005/0063536 | A1 | 3/2005 | Myllyla et al. |
| 2013/0230184 | A1 | 9/2013 | Kuech et al. |
| 2014/0363008 | A1 | 12/2014 | Chen et al. |

OTHER PUBLICATIONS

K. Lebart et al., "A New Method Based on Spectral Subtraction for Speech Dereverberation", acta Acustica , vol. 87 , pp. 359-366, 2001.

Christian Schuldt et al., "A Combined Implementation of Echo Suppression, Noise Reduction and Comfort Noise in a Speaker Phone Application", Digest of Technical Papers International Conference on Consumer Electronics, 2007, 3 sheets.

Amit S. Chhetri et al., "Regression-based Residual Acoustic Echo Suppression", International Workshop on Acoustic Echo and Nose Control, Eindhoven, The Netherlands, Sep. 12-15, 2005, 4 sheets.

Rainer Martin, Gerald Werner Enzner, Peter Vary and R\ufcdiger Hoffmann, "The Tight Relation Between Acoustic Echo Cancelation and Residual Echo Suppression By Postfiltering", Institute of Communication Systems and Data Processing IND, Aachen University of Technology, D-52056 Aachen, Institute of Communications Technology Technical University of Braanschweig, Schleinitzstrasse 22, D-38106 Braanschweig, Ruhr University Bochum 2002, 8 sheets.

Rainer Martin, "Spectral Subtraction Based on Minimum Statistics", Institute for Communication Systems and Data Processing (IND), Aachen University of Technology, Temlergraben 55, 52056 Aachen, Germany, Proc. Euro. Signal Processing Conf. (EUSIPCO), 1994, pp. 1182-1185.

Jason Wung, "A system Approach to Multi-Channel Acoustic Echo Cancellation and Residual Echo Suppression for Robust Hands-free Teleconferencing", Georgia Institute of Technology, May 2015, 167 sheets.

Supplementary European Search Report dated Nov. 29, 2021, from EP Application No. 19799422.1, 8 sheets.

* cited by examiner

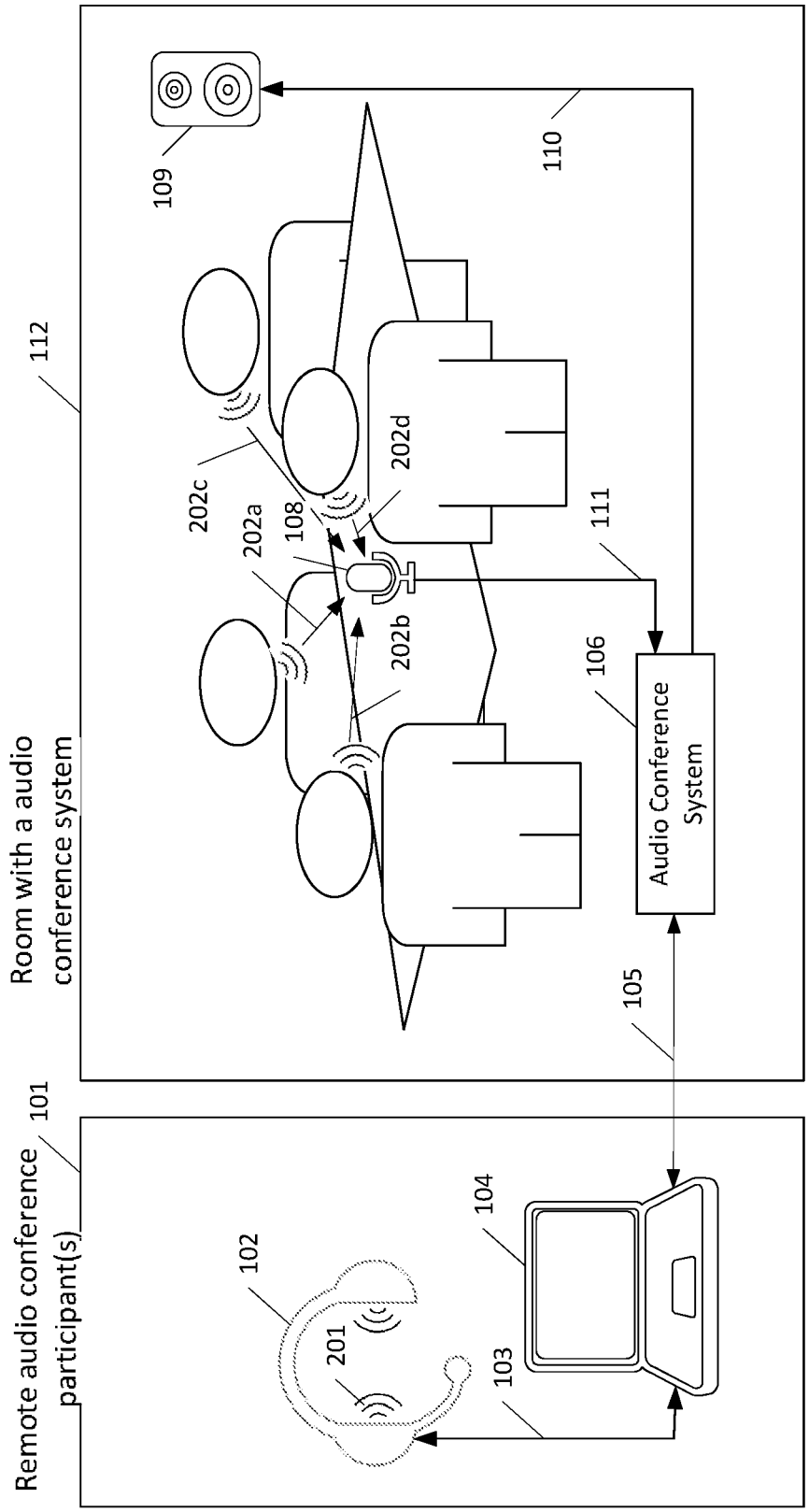
FIG. 2a Desired Microphone Signals

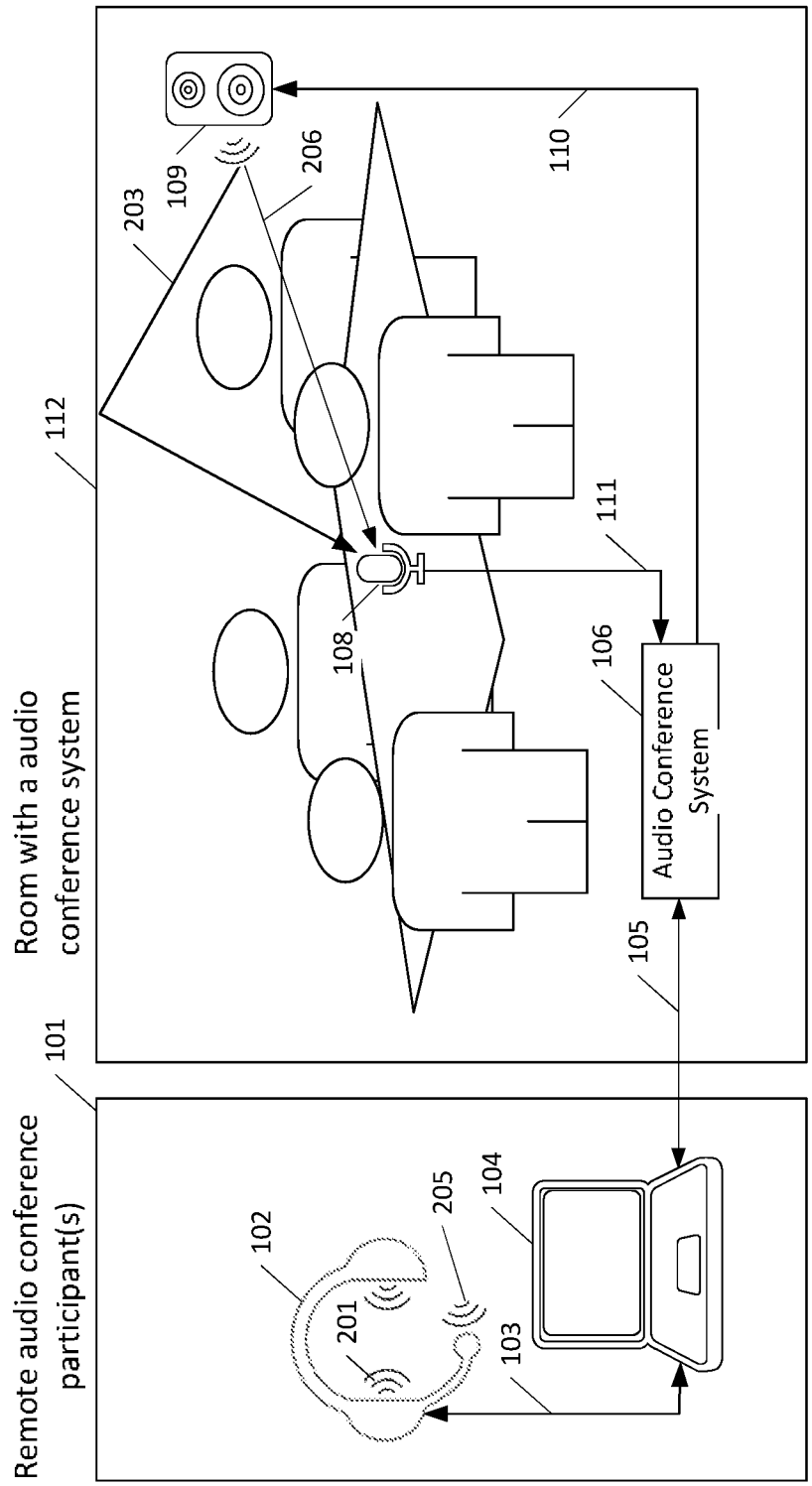
FIG. 2b Undesired Echo Signals

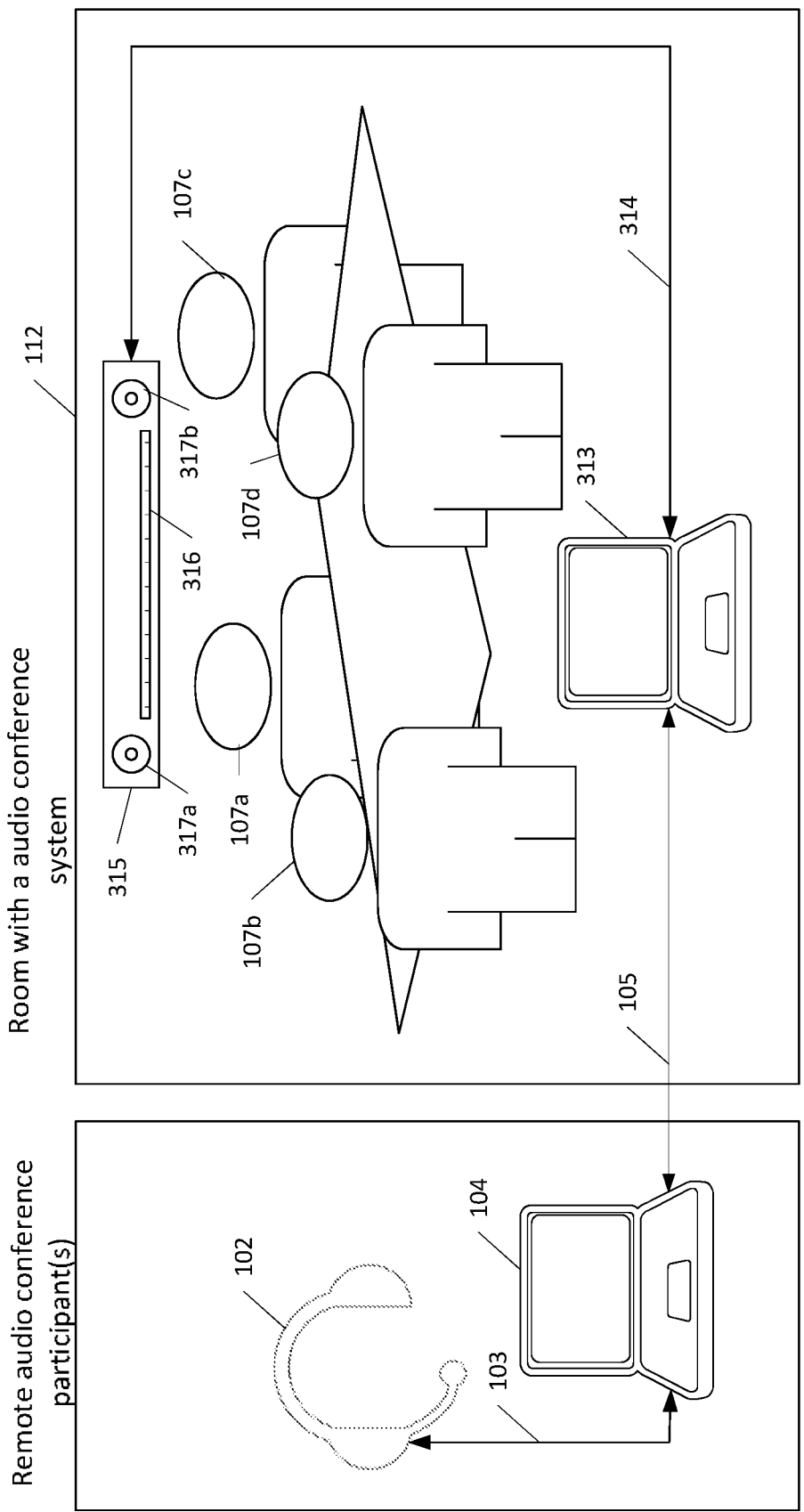
FIG. 3 Microphone Array and Speaker Conference System

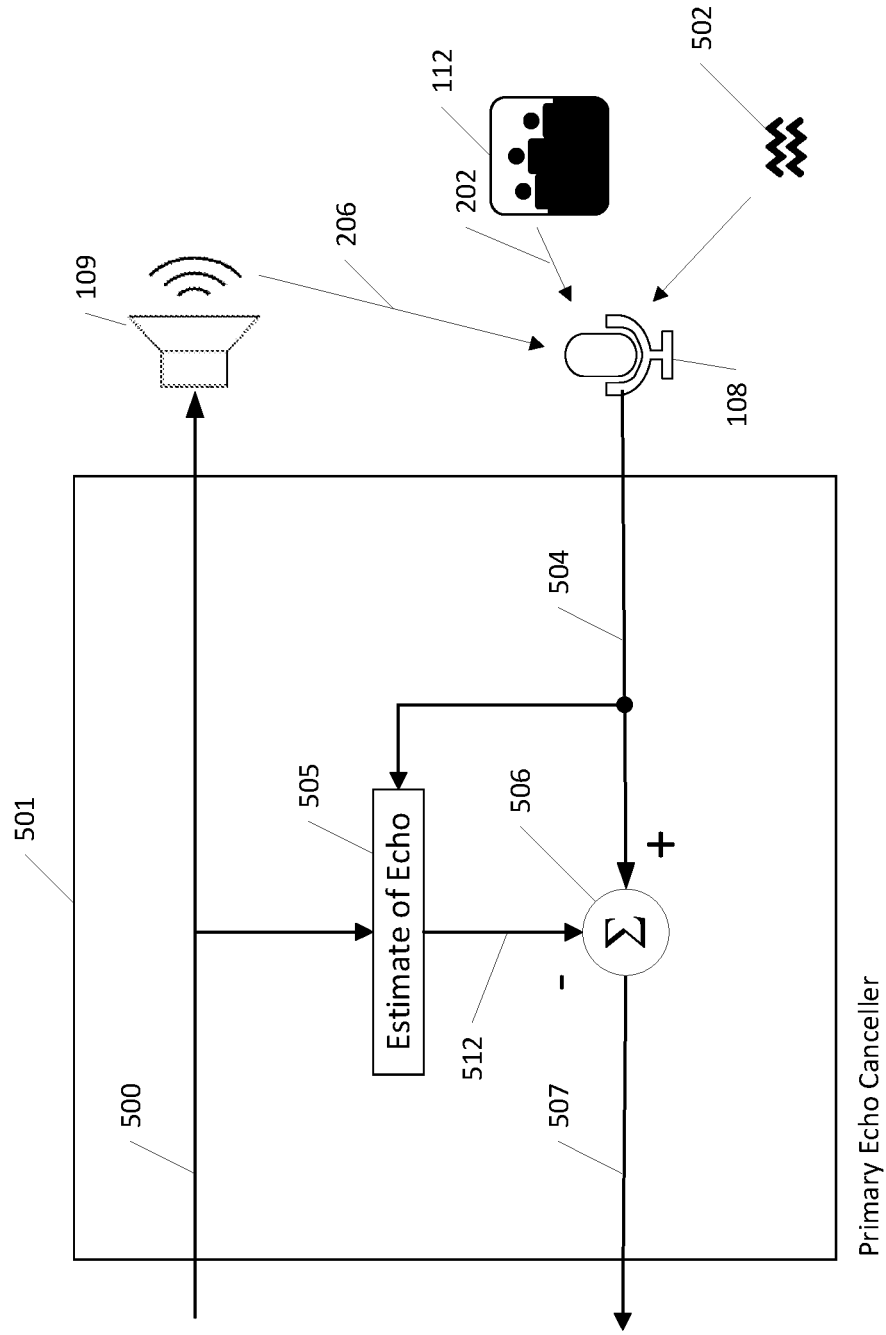
FIG. 5a Prior Art – Primary Stage Echo Cancelation

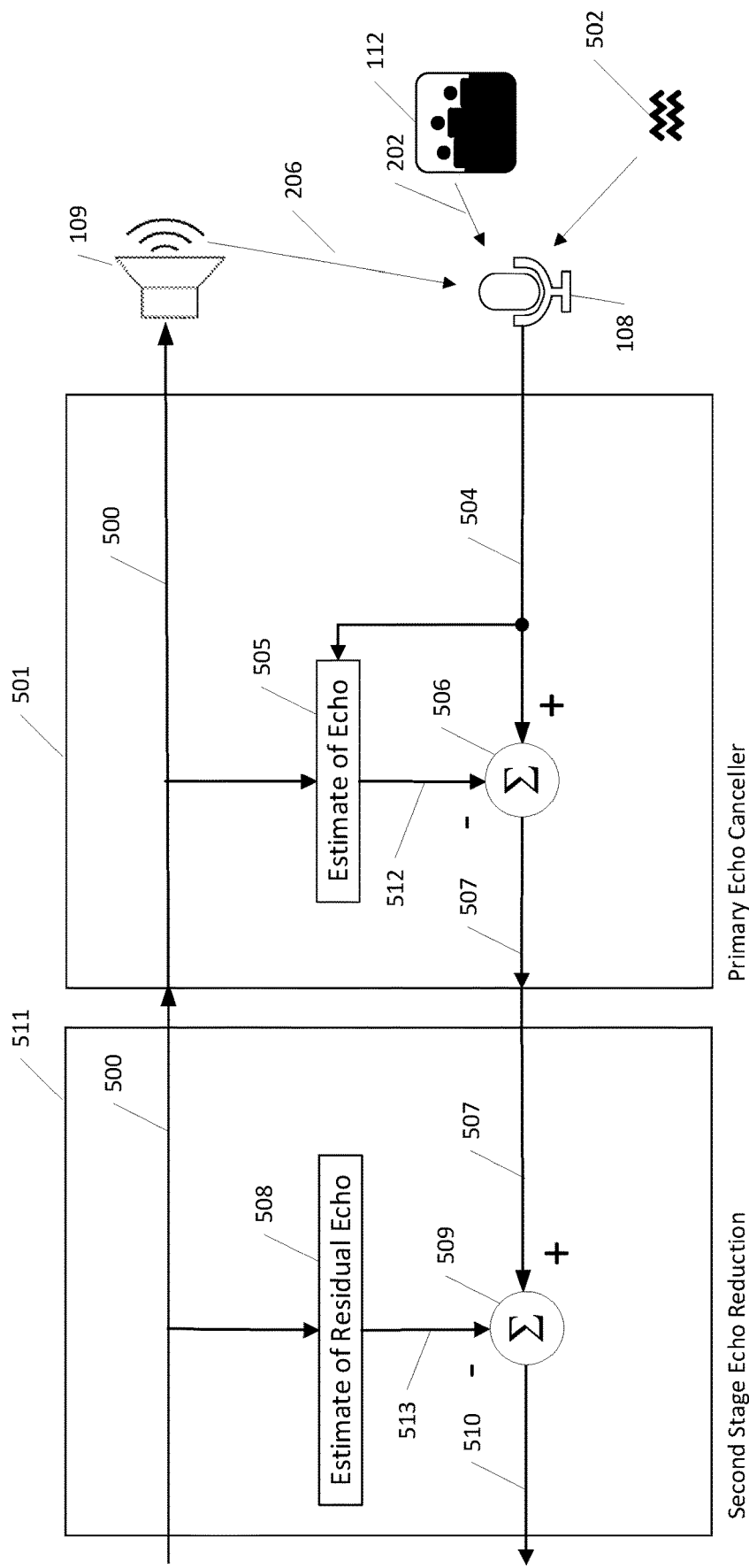
FIG. 5b Prior Art – Primary and Secondary Stage Echo Processing

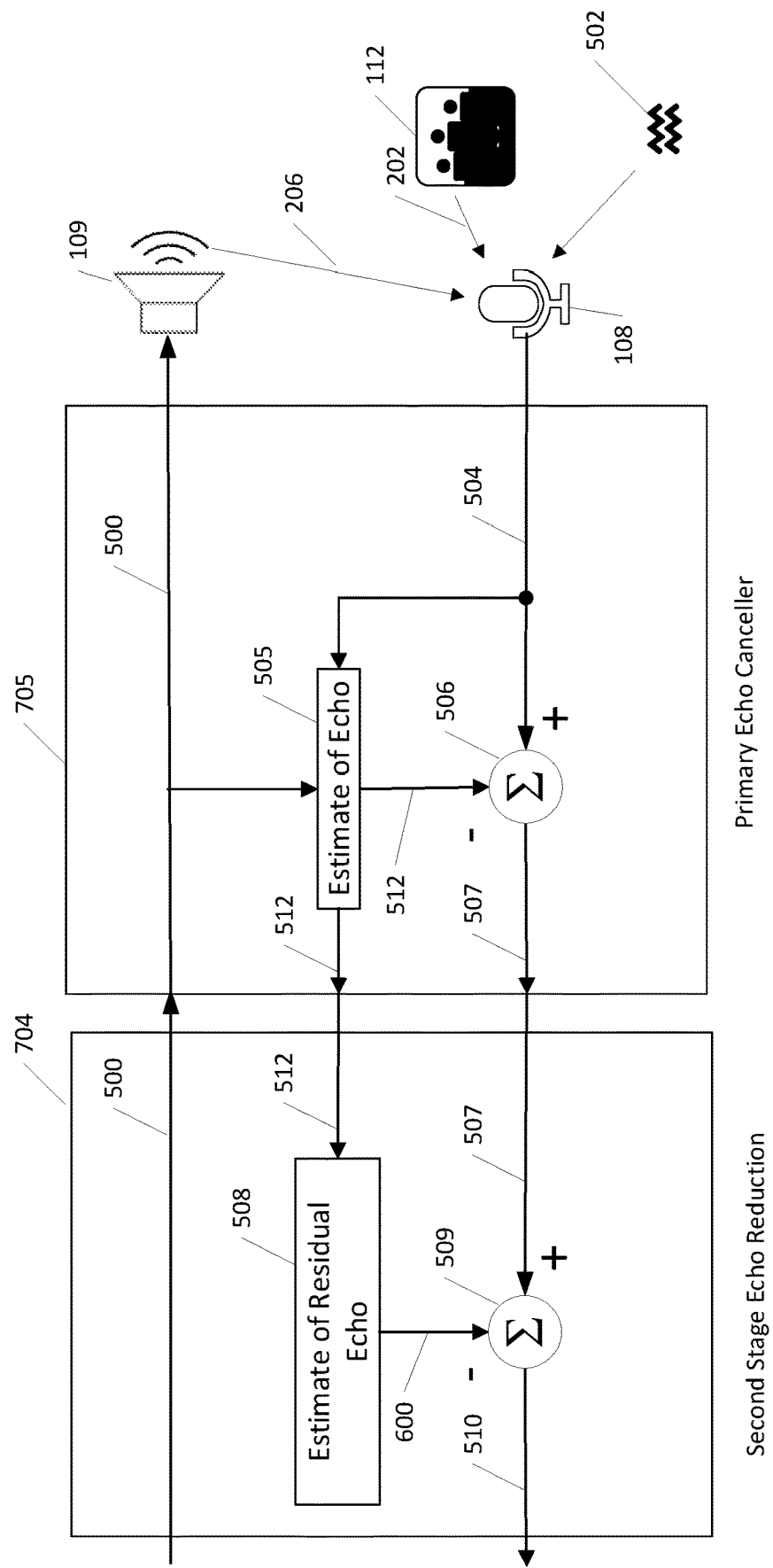
FIG. 6a – Improved Secondary Stage Echo Processing

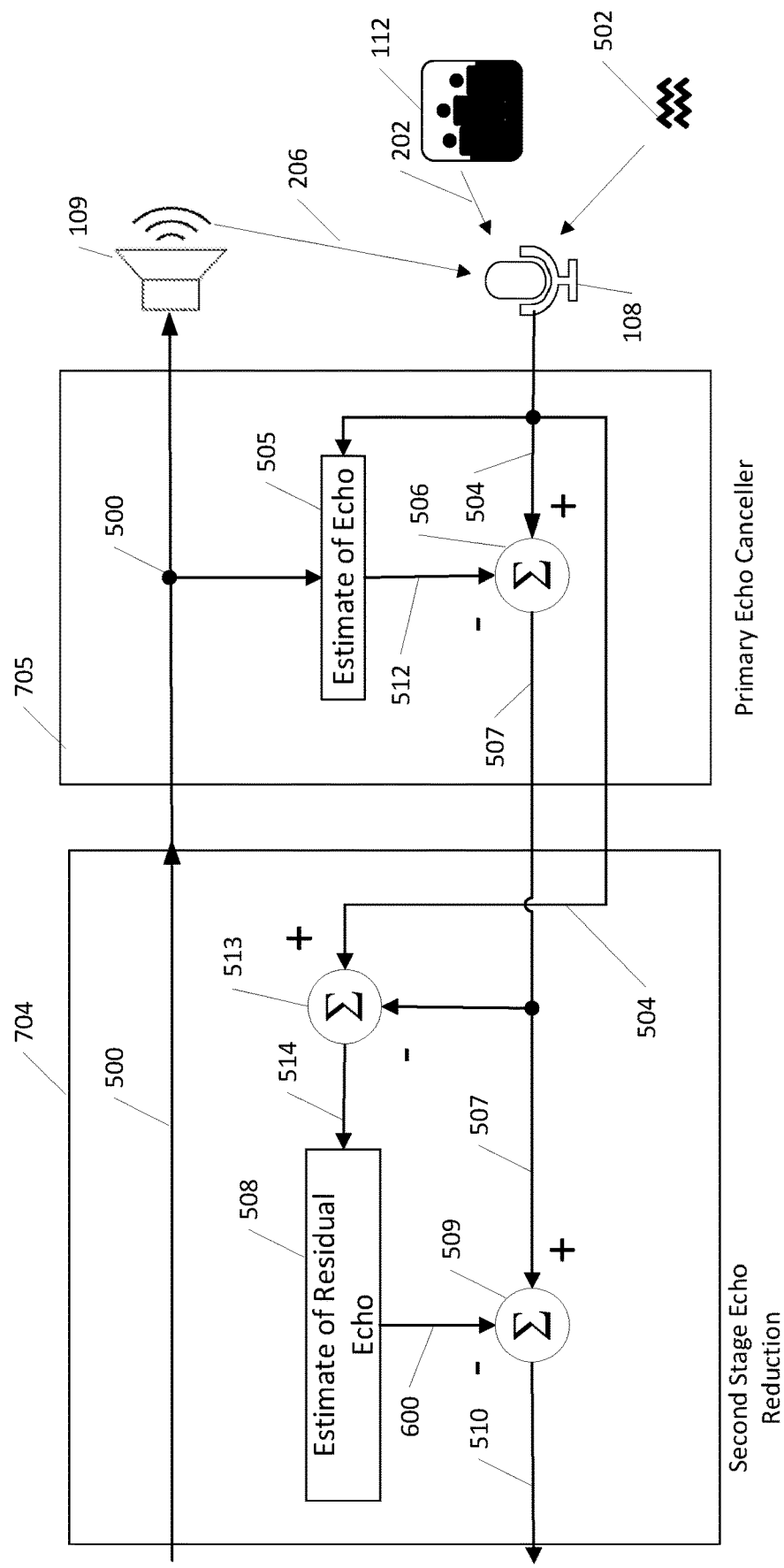
FIG. 6b – Improved Secondary Stage Echo Processing

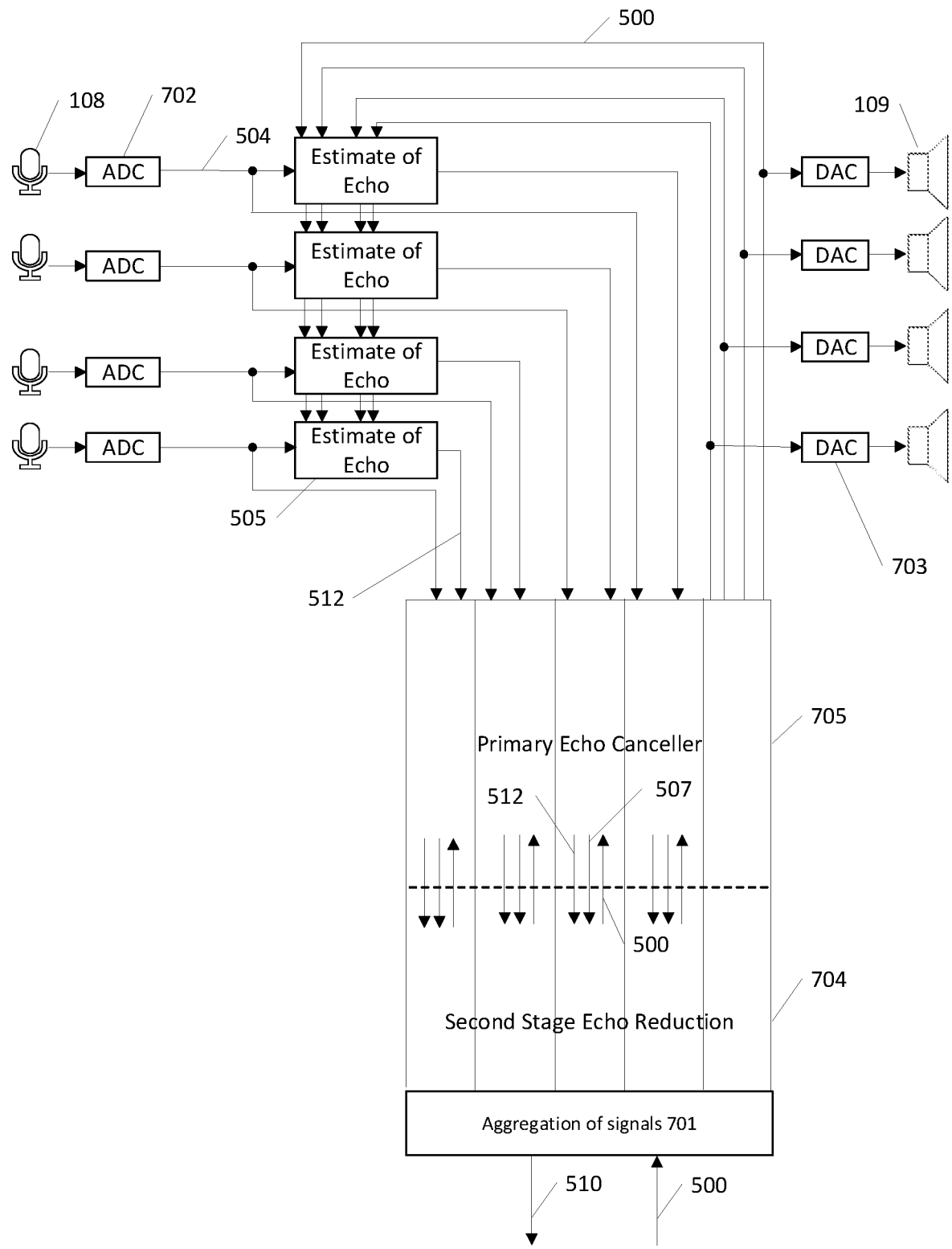
FIG. 7a System Architecture

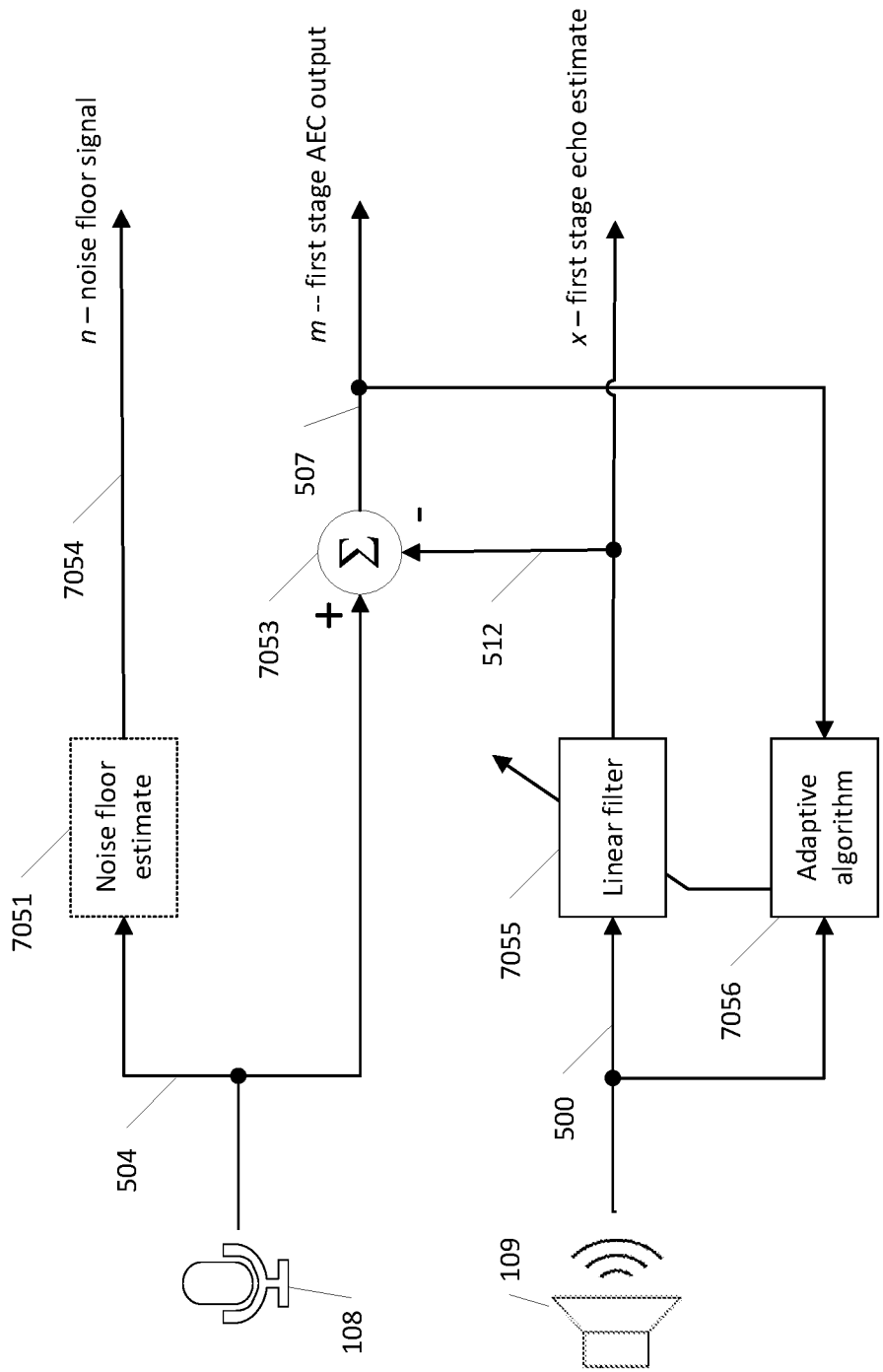
FIG. 7b (705) Primary Echo Canceller

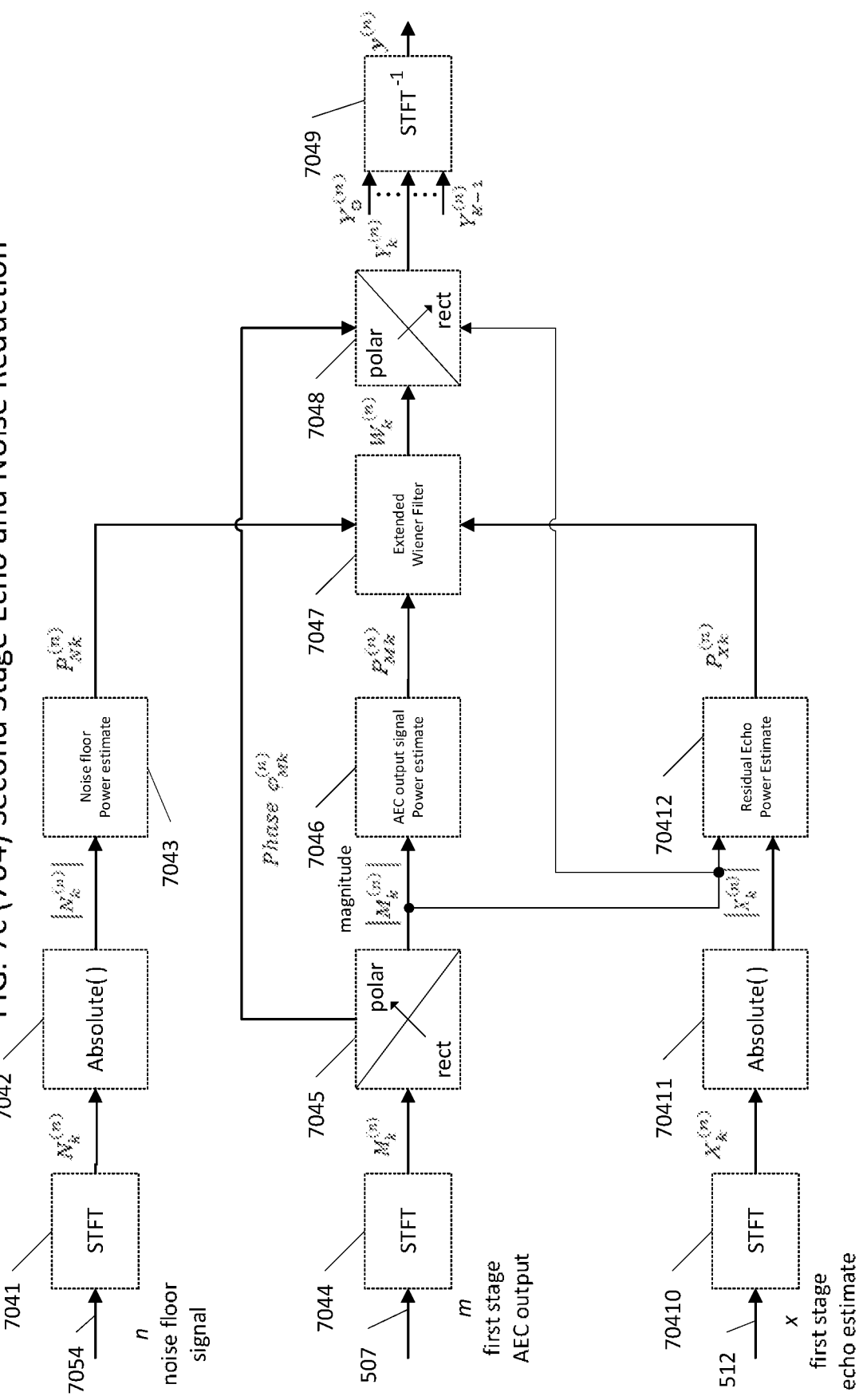

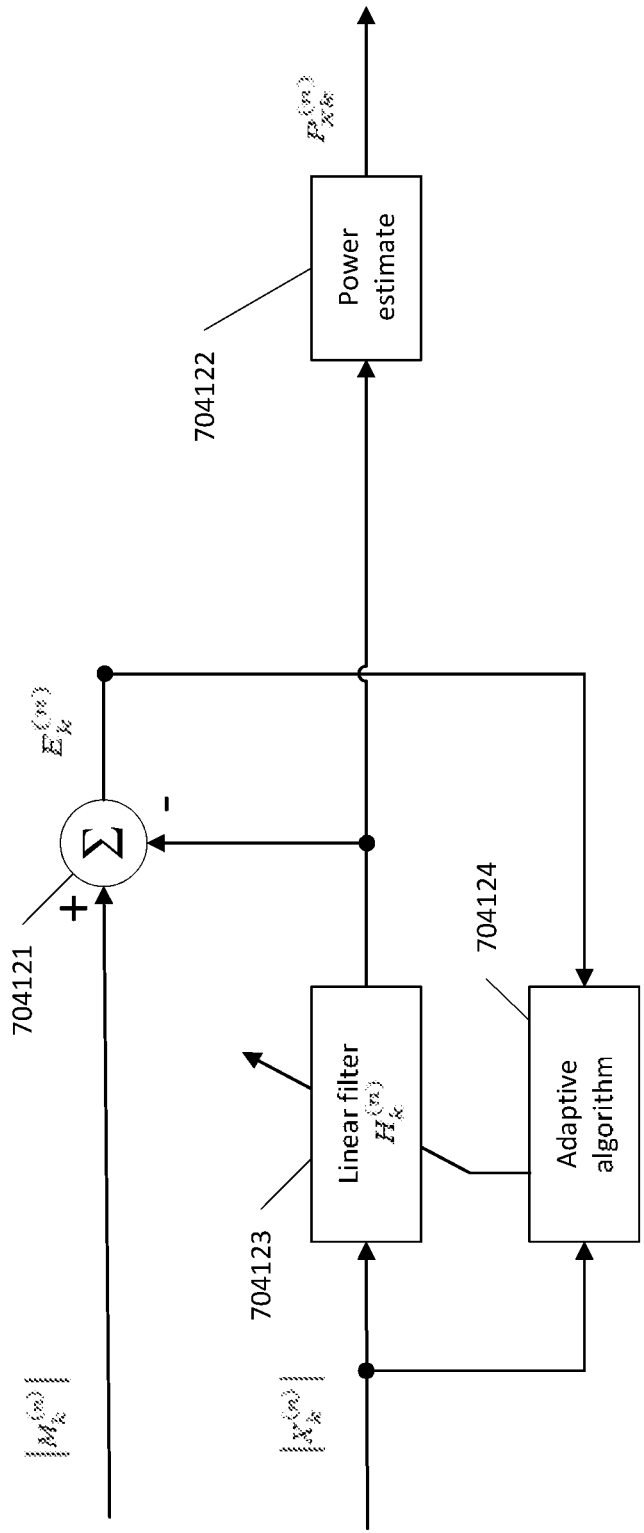
FIG. 7d (70412) Residual Echo Power Estimate

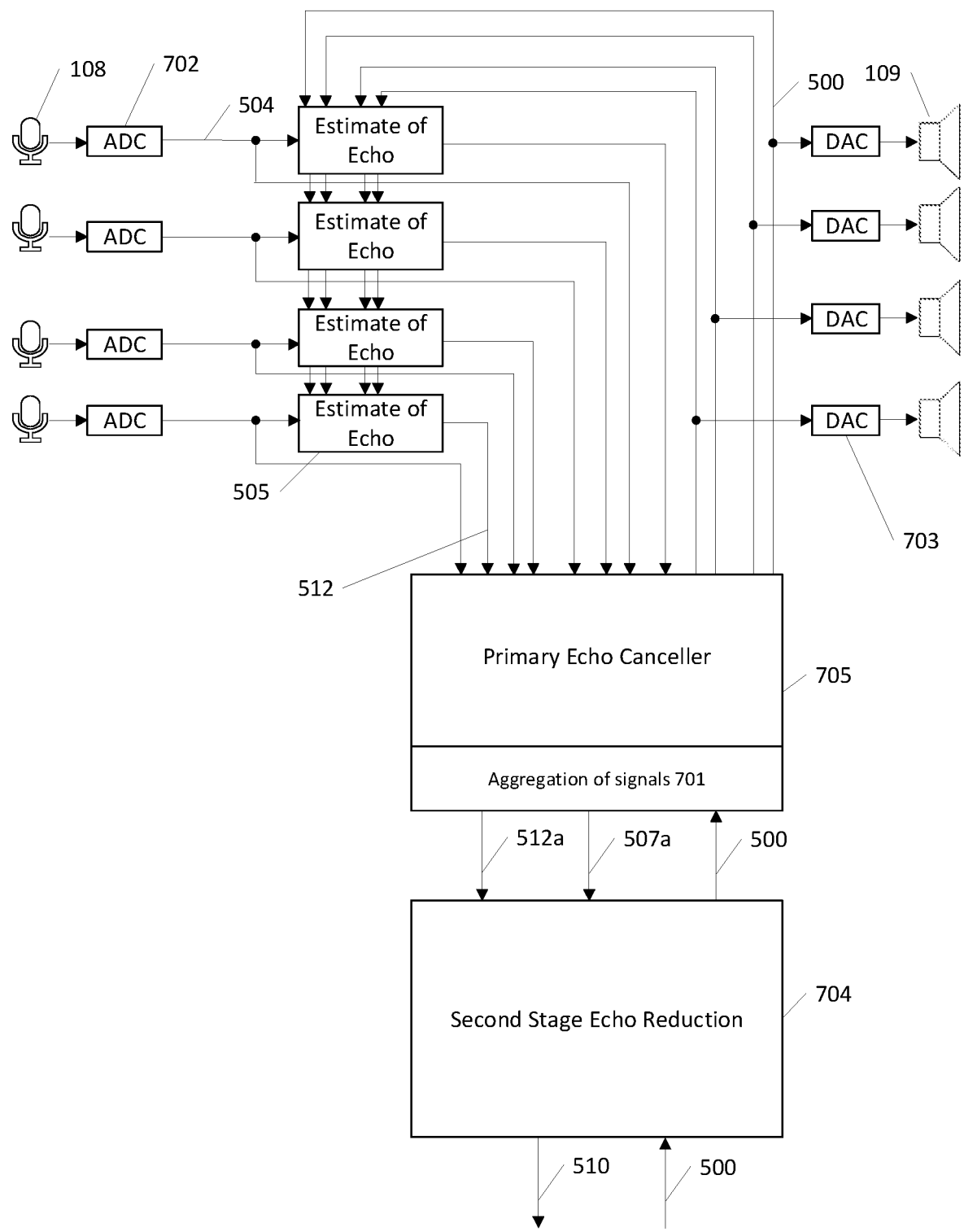

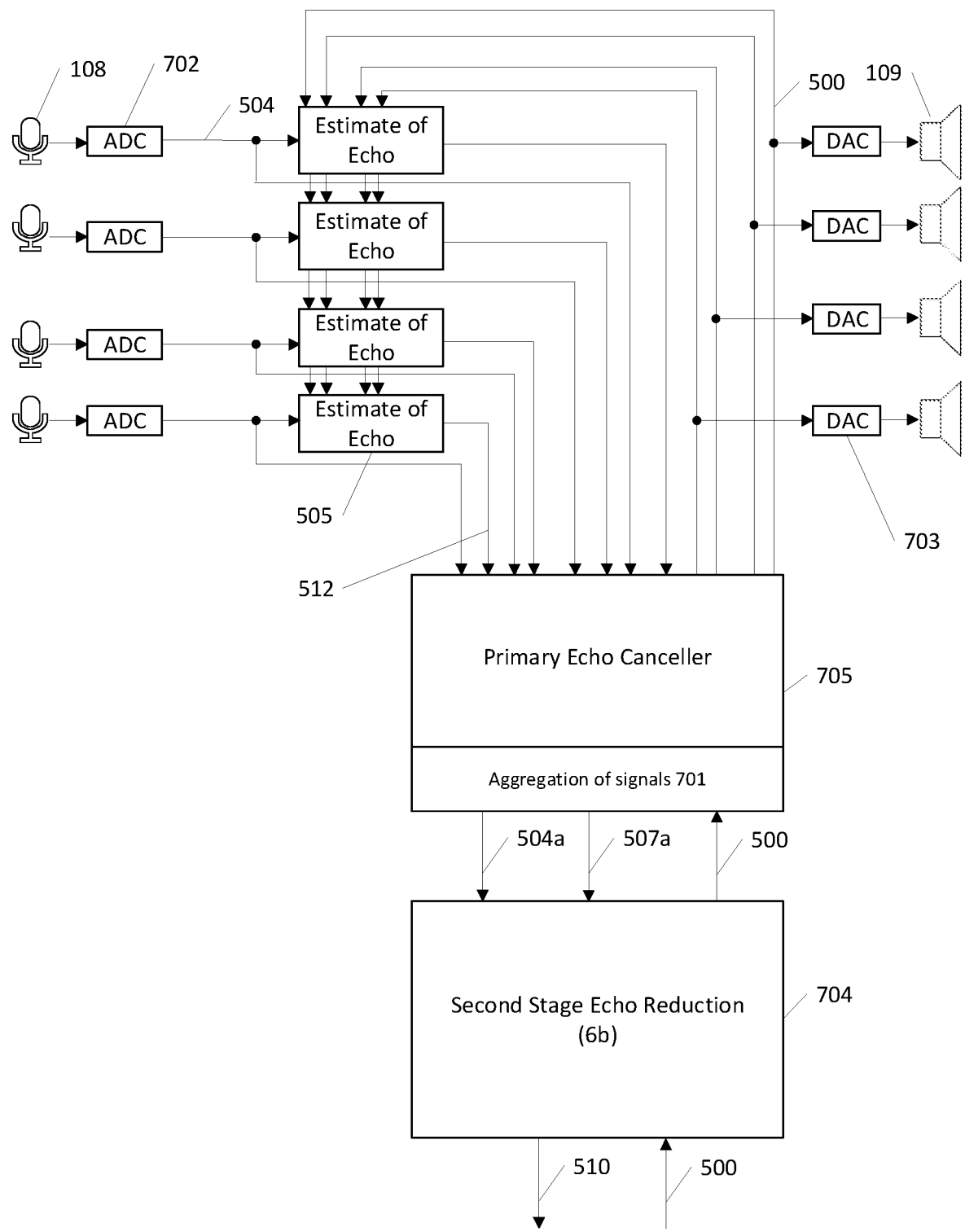
FIG. 7f Alternative System Architecture

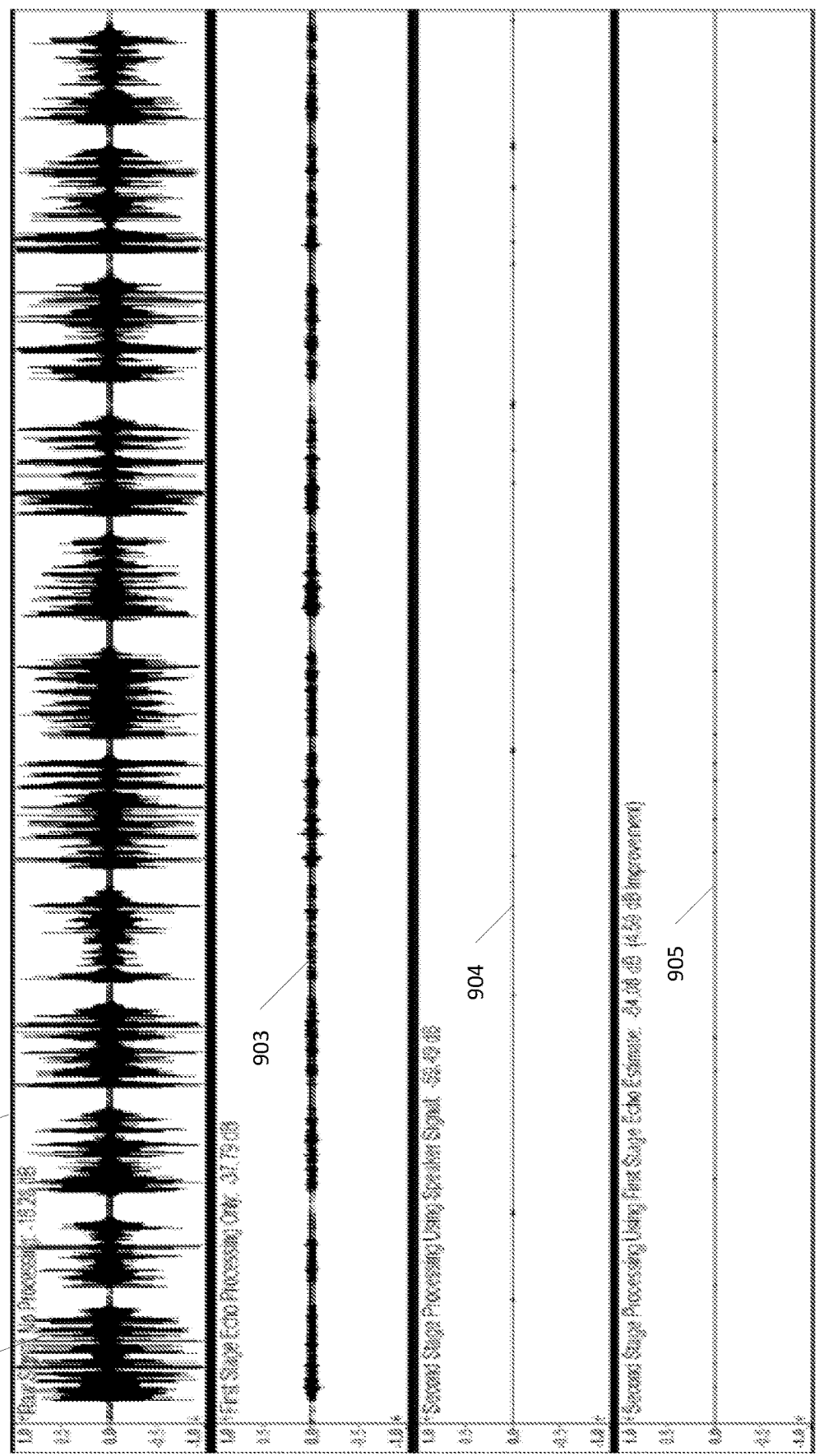
FIG. 9 Test Results

METHOD, APPARATUS, AND COMPUTER-READABLE MEDIA UTILIZING RESIDUAL ECHO ESTIMATE INFORMATION TO DERIVE SECONDARY ECHO REDUCTION PARAMETERS

This application is a continuation of U.S. patent application Ser. No. 16/407,636, filed May 9, 2019, which claims priority to U.S. Provisional Patent Application No. 62/669,020, filed May 9, 2018, the entire contents of all which are incorporated herein by reference.

BACKGROUND OF THE INVENTION

1. Field of the Invention

The present invention generally relates to audio conference systems, and more particularly, to echo cancelation and suppression in a bi-directional audio communications link for multi-user conference situations for optimum audio signal and noise level performance.

2. Description of Related Art

Obtaining high quality audio at both ends of a conference call is difficult to manage due to, but not limited to, variable room dimensions, dynamic seating plans, roaming participants, unknown number of microphones and locations, unknown speaker system locations, known steady state and unknown dynamic noise, variable desired sound source levels, and unknown room reverberation characteristics. This may result in, at the remote (far-end) of a conference call, audio having a combination of desired sound sources (participants) and undesired sound sources (return speaker echo signals, etc.). Because the microphone system is typically not able to differentiate the desired sound sources from the undesired sound sources, this can result in a distorted received microphone signal that often requires complex return echo filtering, solving such problems has proven difficult and insufficient within the current art.

When a remote conference participant (far-end) speaks during the conference call, the conference room (near-end) will hear the remote participants voice through the in-room conference speaker system. The conference room (near-end) microphone system will also pick-up the conference speaker systems output signal(s). Such signal(s) are referred to as the undesired sound source (e.g., return speaker echo signal). If a near-end conference participant (desired sound source) happens to speak at the same time, the microphone system will also pick up this signal. The resultant near-end microphone signal will be a combination of desired and undesired sound sources. The undesired sound source needs to be removed from the audio signal as it may be fed back to the remote participant who will hear this signal as an echo signal (return speaker echo signal) of their voice. If this scenario is allowed to persist, the echo signal can cause significant distortion and may overload the system. In a full duplex system, when the remote participant and the near-end participant are talking at the same time (e.g., double talk), the return echo signal can be very difficult to remove without distorting the desired near-end participant signal.

In the currently known art there have been various approaches to solving the complex issue(s) of managing return speaker echo signals within the microphone(s) audio signal path from multi-microphone and multi-speaker installs in reverberant sound spaces. Each additional speaker and microphone located in the sound space increases the number of possible echo return signals in the microphone signal path. Typically, the reduction of return echo signals is accomplished with an acoustic echo canceler (AEC). AEC is used to cancel out the initial primary return echo signal (direct path and reverberant speaker in-room sound signals) that are generated by the in-room conference speaker system and picked up by the in-room microphone system. AEC typically subtracts the estimated return speaker echo signal from the microphone pickup signal resulting in an echo reduced audio signal that is transmitted to remote participants through third party telephone, network, and/or teleconference software such as Microsoft Skype, for example. If acoustic echo cancelation methods are not implemented, the conference room conversations would be hard to hear and understand at the remote (far-end) of the conference call with the desired sound source sources combined with the undesired return echo sources, which would typically create confusion and the audio effect of multiple participants speaking at the same time with a return echo signal of the remote participant propagated throughout the audio conference call. The communication system may not be able to manage the signal properly, as the return echo signal can create a feedback loop, which would overdrive the system resulting in clipping of the signal and adding significant distortion. This scenario would not be acceptable in an audio conference situation.

If the conference room is reverberant, numerous return echo signals may be generated which can create a situation where there are more return echo signals than the primary echo canceler can handle. This may result in the audio signal containing return echo artifacts passed through to the remote participants (far-end) of the conference system. As the number of in-room (near-end) speakers and microphones increases, the complexity of designing the AEC goes up considerably with each microphone-to-speaker combination especially when the added in-room (near-end) reverberation sound signals for each combination are included. In the current art, primary AEC has proven insufficient in dealing with very complex combined signals and the likelihood of unwanted return echo signals passing through the microphone pick up audio chain increases significantly, which usually results in a second stage acoustic echo suppression being required. Paper 3 "Regression-based Residual Acoustic Echo Suppression" describes this problem and illustrates one approach for dealing with residual echo signals by implementing a secondary echo suppression processor utilizing the far-end speaker signal. The AEC needs to remove as much of the return echo from the desired audio stream while minimizing distortion and artifacts introduced to the desired audio signal. Using only the far-end speaker signal as a reference for the echo canceller circuit can be problematic as the far-end speaker signal does not contain the calibration parameters calculated from the room impulse response measurements, for the near-end room response which will affect the performance and end result of the echo suppression. This typically requires complex calibration and approximation techniques that may not be suitable and or effective for all environments and system configurations. As additional speakers and microphones are added to the room audio conference system, the complexity of the primary echo canceller grows. U.S. Pat. No. 8,385,557 B2 describes these issues and a possible solution, but as is apparent in FIG. 5 of the '557 patent, the solution is designed around an estimation based on the input speaker signal. Another approach in use by current art involves looking at the speech-to-echo content of the echo cancelled microphone signal to determine a damping effect to apply to reduce the residual echo. The '557 patent highlights the difficulty of this approach and the potential weakness of using the method during double talk scenarios when speech content is present in both the near-end and residual far-end signals.

Thus, the current art is not able to provide sufficient echo suppression performance in regard to acceptable audio bi-directional communication taking into account multiple microphone to speaker combinations, complex in-room reverberation, and return echo signals.

Book 1: "Sound Capture and Processing: Practical Approaches", Ivan Jelev Tashev, Microsoft Research, USA. First published 2009 describes the causes and solutions for such problems.

Paper 1: "A New Method Based on Spectral Subtraction for Speech Dereverberation", K. Lebart et al., acta Acustica, Vol 87, pp. 359-366, 2001 describes a monaural method for the suppression of late room reverberation from speech signals, based on spectral subtraction, is presented. The problem of reverberation suppression differs from classical speech de-noising in that the "reverberation noise" is non-stationary. In this paper, the use of a novel estimator of the non-stationary reverberation noise power spectrum, based on a statistical model of late reverberation, is presented. The algorithm is tested on real reverberated signals. The performances for different RIRs (Room Impulse Responses) with ranging from 0.34 second to 1.7 second consistently show significant noise reduction with little signal distortion. Moreover, when used as a front end to an automatic speech recognition system, the algorithm brings about dramatic improvements in terms of automatic speech recognition scores in various reverberant environments.

Paper 2: "A Combined Implementation of Echo Suppression, Noise Reduction and Comfort Noise in a Speaker Phone Application", Christian Schuldt et al., Digest of Technical Papers International Conference on Consumer Electronics, 2007, describes Echo suppression, noise reduction and comfort noise are desirable features in loudspeaker phone products. This paper proposes a set of algorithms for a combined, sub-band based, implementation of these three processing blocks. The proposed algorithms are verified by evaluation of a fix-point real-time implementation Paper 3: "Regression-based Residual Acoustic Echo Suppression", Amit S. Chhetri et al., International Workshop on Acoustic Echo and Nose Control, Eindhoven, Sep. 12-15, 2005, proposes a novel regression-based algorithm for suppressing the residual echo present in the output of an acoustic echo canceller (AEC). The article discusses a functional relationship between the magnitudes of many frames of the speaker signal and the magnitude of the echo residual, per sub-band. It estimates and tracks the parameters of this function using adaptive algorithms (e.g. Normalized Least Mean Squares (NLMS)). The article shows that this approach can be interpreted as a rank-1 approximation to a more general regression model, and can address shortcomings of the earlier approaches based on correlation analysis. Preliminary results using linear regression on magnitudes of real audio signals in both mono and stereo situations demonstrate an average of 7 dB of echo suppression over the AEC output signal under a wide variety of conditions without near-end signal distortion. 06902177

Paper 4: "The Tight Relation Between Acoustic Echo Cancelation and Residual Echo Suppression By Postfiltering", Rainer Martin, Gerald Werner Enzner, Peter Vary and R\ufcdiger Hoffmann, Ruhr University Bochum 2002, describes the acoustic environment of mobile hands-free telephones to provide low signal-to-noise ratios and considerable acoustic feedback at the local microphone. Adaptive filters are typically used for feedback cancellation. However, there is often residual echo due to insufficient performance of the echo canceler. It has been shown in [1, 2, 3] that the postfilter for combined residual echo and noise suppression improves the feedback attenuation in the duplex connection.

Paper 5: "Spectral Subtraction Based on Minimum Statistics", Rainer Martin, in Proc. Euro. Signal Processing Conf. (EUSIPCO), 1994, presents and analyses an algorithm for the enhancement of noisy speech signals by means of spectral subtraction. In contrast to the standard spectral subtraction algorithm, the proposed method does not need a speech activity detector nor histograms to learn signal statistics. The algorithm is capable to track non-stationary noise signals and compares favorably with standard spectral subtraction methods in terms of performance and computational complexity. The noise estimation method is based on the observation that a noise power estimate can be obtained using minimum values of a smoothed power estimate of the noisy speech signal. Thus, the use of minimum statistics eliminates the problem of speech activity detection. The proposed method is conceptually simple and well suited for real time implementations. The article derives an unbiased noise power estimator based on minimum statistics and discuss its statistical properties and its performance in the context of spectral subtraction Spectral Subtraction Based on Minimum Statistics.

Paper 6: "A system Approach to Multi-Channel Acoustic Echo Cancellation and Residual Echo Suppression", Jason Wung, Georgia Institute of Technology, May 2015, thesis presentation describes the objective of the research is to achieve a systematic combination of acoustic echo reduction components that together achieve a robust performance of the MCAEC (Multi-Channel Acoustic Echo Cancellation) system as a whole. Conventional approaches to the acoustic echo reduction system typically assume that individual components would perform ideally. For example, the adaptive algorithm for AEC is often developed in the absence of strong near-end signal, the algorithm for RES (Residual Echo Suppression) is often an added module that is developed as a separate noise reduction component, and the decorrelation procedure for MCAEC is yet another add-on module that simply introduces some form of distortion to the reference signal. The main challenge is in designing a consistent criterion across all modules that can be jointly optimized to form a more consistent framework for acoustic echo reduction. The decorrelation procedure can potentially benefit from the system approach as well if it is designed by taking the near-end listener into account. The MCAEC system should be optimized not only for the echo cancellation and suppression performance, but also for the reference signal quality after the added distortion from the decorrelation procedure. Finally, a tuning strategy is presented to jointly optimize the parameters across all modules using object criteria. for Robust Hands-Free Teleconferencing U.S. Pat. No. 8,385,557 B2 discloses a multichannel acoustic echo reduction system is described. The system includes an acoustic echo canceller (AEC) component having a fixed filter for each respective combination of loudspeaker and microphone signals and having an adaptive filter for each microphone signal. For each microphone signal, the AEC component modifies the microphone signal to reduce contributions from the outputs of the loudspeakers based at least in part on the respective adaptive filter associated with the microphone signal and the set of fixed filters associated with the respective microphone signal.

U.S. Pat. No. 4,998,241 A discloses an echo canceller comprising an adaptive filter (15). The adaptation rate of the adaptive filter (15) is controlled by means of a control unit (29) determining the appropriate control signal in response to its input signals (x(k), u(f), e(k)). If the described echo canceller is inserted, for example, in the subscriber set of a telephone network, the adaptation process is to be effected only when the far-end subscriber is talking and the near-end subscriber is silent. If such a decision is automatically made with the associated signals (x(k), u(k)), an erroneous decision may, at least temporarily, considerably degrade the quality of the telephone communication. For this reason, the adaptation rate of the adaptive filter (15) is provided to be controlled in a gradual manner by means of the control unit (29) in response to suitably chosen mean values of its three input signals (x(k), u(k), e(k)), when the far-end subscriber is talking.

U.S. Pat. No. 6,175,602 B1 discloses methods and apparatus for providing speech enhancement in noise reduction systems and includes spectral subtraction algorithms using linear convolution, causal filtering, and/or spectrum-dependent exponential averaging of the spectral subtraction gain function. According to exemplary embodiments, low order spectrum estimates are developed which have less frequency resolution and reduced variance, as compared to spectrum estimates in conventional spectral subtraction systems. The low order spectra are used to form a gain function having a desired low variance which, in turn, reduces musical tones in the spectral subtraction output signal. Advantageously, the gain function can be further smoothed across blocks using input spectrum dependent exponential averaging. Additionally, the low order of the gain function permits a phase to be added during interpolation so that the spectral subtraction gain filter is causal and prevents discontinuities between blocks.

U.S. Pat. No. 6,459,914 B1 discloses methods and apparatus for providing speech enhancement in noise reduction systems include spectral subtraction algorithms using linear convolution, causal filtering, and/or spectrum dependent exponential averaging of the spectral subtraction gain function. According to exemplary embodiments, successive blocks of a spectral subtraction gain function are averaged based on a discrepancy between an estimate of a spectral density of a noisy speech signal and an averaged estimate of a spectral density of a noise component of the noisy speech signal. The successive gain function blocks are averaged, for example, using controlled exponential averaging. Control is provided, for example, by making a memory of the exponential averaging inversely proportional to the discrepancy. Alternatively, the averaging memory can be made to increase in direct proportion with decreases in the discrepancy, while exponentially decaying with increases in the discrepancy to prevent audible voice shadows.

U.S. Pat. No. 6,487,257 B1 discloses, for purposes of noise suppression, how spectral subtraction filtering is performed in sample-wise fashion in the time domain using a time-domain representation of a spectral subtraction gain function computed in block-wise fashion in the frequency domain. By continuously performing time-domain filtering on a sample by sample basis, the disclosed methods and apparatus avoid block-processing delays associated with frequency-domain based spectral subtraction systems. Consequently, the disclosed methods and apparatus are particularly well suited for applications requiring very short processing delays. In applications where only stationary, low-energy background noise is present, computational complexity is reduced by generating a number of separate spectral subtraction gain functions during an initialization period, each gain function being suitable for one of several predefined classes of input signal (e.g., for one of several predetermined signal energy ranges), and thereafter fixing the several gain functions until the input signal characteristics change.

U.S. Pat. No. 6,507,623 B1 discloses, for purposes of noise suppression, how spectral subtraction filtering is performed in sample-wise fashion in the time domain using a time-domain representation of a spectral subtraction gain function computed in block-wise fashion in the frequency domain. By continuously performing time-domain filtering on a sample by sample basis, the disclosed methods and apparatus avoid block-processing delays associated with frequency-domain based spectral subtraction systems. Consequently, the disclosed methods and apparatus are particularly well suited for applications requiring very short processing delays. Moreover, since the spectral subtraction gain function is computed in a block-wise fashion in the frequency domain, high quality performance in terms of reduced tonal artifacts and low signal distortion is retained.

U.S. Pat. No. 6,717,991 B1 discloses how speech enhancement is provided in dual microphone noise reduction systems by including spectral subtraction algorithms using linear convolution, causal filtering, and/or spectrum dependent exponential averaging of the spectral subtraction gain function. According to exemplary embodiments, when a far-mouth microphone is used in conjunction with a near-mouth microphone, it is possible to handle non-stationary background noise as long as the noise spectrum can continuously be estimated from a single block of input samples. The far-mouth microphone, in addition to picking up the background noise, also picks up the speaker's voice, albeit at a lower level than the near-mouth microphone. To enhance the noise estimate, a spectral subtraction stage is used to suppress the speech in the far-mouth microphone signal. To be able to enhance the noise estimate, a rough speech estimate is formed with another spectral subtraction stage from the near-mouth signal. Finally, a third spectral subtraction function is used to enhance the near-mouth signal by suppressing the background noise using the enhanced background noise estimate. A controller dynamically determines any or all of a first, second, and third subtraction factor for each of the first, second, and third spectral subtraction stages, respectively.

U.S. Pat. No. 6,925,176 B2 discloses an improvement to a digital Acoustic Echo Control (AEC) in hands-free telephones. It describes an additional adaptive filter referred to as a residual echo filter, which is placed after the usual echo canceller and it is used to efficiently and accurately estimate a residual echo signal b(i) and a system coupling factor β(i), which can be utilized to establish an efficient control for the AEC system and construct the appropriate filters. The '176 patent also describes a control block means performing a joint operation control of the echo canceller, residual echo suppressor and residual echo filter for achieving more consistent echo cancellation results and enhancing output signal quality.

U.S. Pat. No. 7,813,499 B2 discloses a regression-based residual echo suppression (RES) system and process for suppressing the portion of the microphone signal corresponding to a playback of a speaker audio signal that was not suppressed by an acoustic echo canceller (AEC). In general, a prescribed regression technique is used between a prescribed spectral attribute of multiple past and present, fixed-length, periods (e.g., frames) of the speaker signal and the same spectral attribute of a current period (e.g., frame) of the echo residual in the output of the AEC. This automatically takes into consideration the correlation between the time periods of the speaker signal. The parameters of the regression can be tracked using adaptive methods. Multiple applications of RES can be used to produce better results and this system and process can be applied to stereo-RES as well.

U.S. Pat. No. 8,275,120 B2 discloses an acoustic echo cancellation technique. The adaptive acoustic echo cancellation technique employs a plurality of acoustic echo cancellation filters which use different adaptation techniques which may employ different parameters, such as step size, to improve both the adaptation algorithm convergence time and misadjustment over previously known acoustic echo cancellation techniques.

U.S. Pat. No. 8,693,678 B2 discloses a device, such as a communication device, comprising an adaptive foreground filter configured to calculate a first echo estimation signal based on a first input signal, and an adaptive background filter being more rapidly adaptive than the foreground filter and configured to calculate a second echo estimation signal based on the first input signal. Embodiments of the device further comprise damping control means for controlling damping of an echo-cancelled output signal. The device in various embodiments provides that the damping control means is configured to calculate a maximum echo estimation signal using both the first and the second echo estimation signals, and controls the damping of the echo-cancelled output signal based on the maximum echo estimation signal and/or a signal derived from said maximum echo estimation signal.

U.S. Pat. No. 8,892,431 B2 discloses a smoothing method for suppressing fluctuating artifacts in the reduction of interference noise that includes the following steps: providing short-term spectra for a sequence of signal frames, transforming each short-term spectrum by way of a forward transformation which describes the short-term spectrum using transformation coefficients that represent the short-term spectrum subdivided into its coarse and fine structures; smoothing the transformation coefficients with the respective same coefficient indices by combining at least two successive transformed short-term spectra; and transforming the smoothed transformation coefficients into smoothed short-term spectra by way of a backward transformation.

U.S. Pat. No. 8,903,722 B2 discloses a method, system, and computer program product for managing noise in a noise reduction system, comprising: receiving a first signal at a first microphone; receiving a second signal at a second microphone; identifying noise estimation in the first signal and the second signal; identifying a transfer function of the noise reduction system using a ratio of a power spectral density of the second signal minus the noise estimation to a power spectral density of the first signal, wherein the noise estimation is removed from only the power spectral density of the second signal; and identifying a gain of the noise reduction system using the transfer function.

U.S. Pat. No. 9,473,646 B1 discloses an acoustic echo canceller (AEC) system may be configured to reset the coefficients of a transform equation when an estimated echo diverges from actual acoustic echo. Features are disclosed for determining when to reset the coefficients, and for enabling the reset operation to be performed reliably. Additional features are disclosed for detecting other signal conditions besides AEC divergence, for adjusting the rate at which the coefficients are adapted in response to such conditions, and for prioritizing between potentially incompatible adjustments.

SUMMARY OF THE INVENTION

An object of the present embodiments is to allow for a substantially reduced echo return signals in the presence of complex room reverberation and high echo return signals regardless of the number of microphone and speaker combinations or placements within the shared sound space environment. And, more specifically, it is an object of the invention to preferably utilize the room transfer function derived primary AEC echo estimate (or reasonable approximation of the estimate as derived from the raw microphone and echo cancelled microphone signals) as an input into the secondary echo reduction/suppression processor to increase the adaptive performance and improve echo return loss parameters beyond the current methods in the art. This ability to use the room transfer function estimate in the secondary echo reduction/suppression processor overcomes the limitations of the prior art which is limited to less adaptive real-time accurate estimation and calibration methods.

According to one aspect of the present invention, the room transfer function is used to derive a first echo estimate which (from an audio processor or like process) is preferably used as input to the secondary echo reduction/suppression processor in order to improve echo reduction performance without negatively impacting overall system audio quality during all modes of operation and specifically during situations where both in-room and far-end audio conference participants are simultaneously speaking in a scenario commonly known as doubletalk. As described previously in regard to the current art, existing solutions may have difficulty in adequately and cleanly removing residual echo components due to dependencies on using the output speaker signal for a reference which does not account for non-linear behavior introduced by changes in room acoustics imparted by environmental changes such as temperature and air pressure changes, non-linearities of the amplifier circuits and physical speaker itself, and/or additions or movement of people and objects within the room.

By utilizing the primary AEC echo estimate (or reasonable approximation of the estimate as derived from the raw microphone and echo cancelled microphone signals) as input into the secondary reduction/suppression processor the reduction/suppression processor is able to preferably use a pre-calibrated echo estimate signal that contains the specifics of the hardware interaction with the room and the room reverberation properties (e.g., room characteristics) which allows the reduction/suppression processor to adapt and suppress complex residual echo signals in real time.

Typical solutions in the current art utilize the generic speaker output signal which has no other information such as hardware or room characteristics which can create an unrealistic estimate input for the secondary reduction/suppression processor, which may lead to poor echo reduction performance. Systems that use the output speaker signal are not able to use the room transfer function and tend to use approximations and complex calibrations and filters which may not be suitable in all situations. This situation is avoided within the presently preferred embodiments as (preferably) the speaker output signal is not used directly as input into the secondary echo reduction/suppression processor, but instead the primary echo estimate (or derived approximation of the estimate) is used, the preferred embodiments having a real-time calibrated echo estimate can effectively adapt and suppress real world dynamic echo return signals. According to the preferred embodiments, there needs to be a primary AEC estimate signal present to input in the secondary echo reduction/suppression processor.

According to a further aspect of the present invention, the primary AEC processor and the secondary echo reduction/suppression processor are collocated and or contained in the same processor.

According to another aspect of the present invention, the primary AEC processor and the secondary echo reduction/suppression processor may be implemented in any combination of firmware, hardware, and/or software, and do not need to be collocated, and/or contained in the same processor supporting any number of microphone and speaker combinations and system architecture topologies.

According to yet another aspect of the present invention, the secondary echo reduction/suppression processor can preferably take, as input, any primary AEC estimate signal regardless of how the AEC estimate is derived, including, but not limited to, an approximation of the echo estimate derived by subtracting the echo-cancelled microphone from the raw microphone signal, or any similar derived estimate.

The present invention provides a real-time adaptable solution to minimize echo return signals within complex systems and problematic reverberant shared spaces.

The preferred embodiments comprise both algorithms and hardware accelerators to implement the structures and functions described herein.

According to another aspect of the preferred embodiments apparatus providing enhanced echo suppression in a conferencing system having at least one microphone and at least one speaker has at least one microphone input receiving at least one microphone input signal from the at least one microphone, and at least one speaker input receiving at least one speaker input signal for the at least one speaker. At least one processor has at least one primary echo-suppressor, which receives (i) the at least one microphone input signal and (ii) the at least one speaker input signal. The at least one primary echo-suppressor provides at least one echo-suppressed microphone signal. The at least one processor also has at least one secondary echo-suppressor, which receives the at least one echo-suppressed microphone signal and provides an output signal. The at least one processor provides the at least one echo-suppressed microphone signal to the at least one secondary echo-suppressor without providing the at least one speaker input signal directly to the at least one secondary echo-suppressor. Preferably, the at least one secondary echo-suppressor: (i) receives from the at least one primary echo-suppressor the at least one echo-suppressed microphone signal and at least one speaker echo estimate signal, (ii) determines at least one estimate of residual echo signal, and (iii) combines the at least one estimate of residual echo signal with the at least one echo-suppressed microphone signal to provide the output signal. Alternately, the at least one secondary echo-suppressor: (i) receives from the at least one primary echo-suppressor the at least one echo-suppressed microphone signal and the at least one microphone input signal, (ii) combines the at least one echo-suppressed microphone signal and the at least one microphone input signal to provide at least one approximation speaker echo estimate signal, (iii) determines at least one estimate of residual echo signal corresponding to the at least one approximation speaker echo estimate signal, and (iv) combines the at least one estimate of residual echo signal with the at least one echo-suppressed microphone signal to provide the output signal.

According to a further aspect of the preferred embodiments, a method of providing enhanced echo suppression in a conferencing system having at least one microphone and at least one speaker, (i) receives at least one microphone input signal from the at least one microphone, (ii) receives at least one speaker input signal for the at least one speaker, (iii) uses at least one processor having at least one primary echo-suppressor, the at least one primary echo-suppressor receiving the at least one microphone input signal and the at least one speaker input signal, the at least one primary echo-suppressor providing at least one echo-suppressed microphone signal, (iv) uses the at least one processor having at least one secondary echo-suppressor, the at least one secondary echo-suppressor receiving the at least one echo-suppressed microphone signal and providing an output signal, (v) the at least one processor providing the at least one echo-suppressed microphone signal to the at least one secondary echo-suppressor without providing the at least one speaker input signal directly to the at least one secondary echo-suppressor. Preferably, the at least one secondary echo-suppressor: (i) receives from the at least one primary echo-suppressor the at least one echo-suppressed microphone signal and at least one speaker echo estimate signal, (ii) determines at least one estimate of residual echo signal, and (iii) combines the at least one estimate of residual echo signal with the at least one echo-suppressed microphone signal to provide the output signal. Alternately, the at least one secondary echo-suppressor: (i) receives from the at least one primary echo-suppressor the at least one echo-suppressed microphone signal and the at least one microphone input signal, (ii) combines the at least one echo-suppressed microphone signal and the at least one microphone input signal to provide at least one approximation speaker echo estimate signal, (iii) determines at least one estimate of residual echo signal corresponding to the at least one approximation speaker echo estimate signal, and (iv) combines the at least one estimate of residual echo signal with the at least one echo-suppressed microphone signal to provide the output signal.

According to yet another aspect of the preferred embodiments, program code embodied in non-transitory computer readable media for providing enhanced echo suppression in a conferencing system having at least one microphone and at least one speaker, said program having instructions cause at least one processor to: (i) receive at least one microphone input signal from the at least one microphone, (ii) receive at least one speaker input signal for the at least one speaker, (iii) wherein the at least one processor has at least one primary echo-suppressor and at least one secondary echo-suppressor, (iv) cause the at least one primary echo-suppressor to receive the at least one microphone input signal and the at least one speaker input signal, and to provide at least one echo-suppressed microphone signal, and (v) cause the at least one secondary echo-suppressor to receive the at least one echo-suppressed microphone signal and to provide an output. Wherein the program code causes the at least one processor to provide the at least one echo-suppressed microphone signal to the at least one secondary echo-suppressor without providing the at least one speaker input signal directly to the at least one secondary echo-suppressor. Preferably, the at least one secondary echo-suppressor: (i) receives from the at least one primary echo-suppressor the at least one echo-suppressed microphone signal and at least one speaker echo estimate signal, (ii) determines at least one estimate of residual echo signal, and (iii) combines the at least one estimate of residual echo signal with the at least one echo-suppressed microphone signal to provide the output signal. Alternately, the at least one secondary echo-suppressor: (i) receives from the at least one primary echo-suppressor the at least one echo-suppressed microphone signal and the at least one microphone input signal, (ii) combines the at least one echo-suppressed microphone signal and the at least one microphone input signal to provide at least one approximation speaker echo estimate signal, (iii) determines at least one estimate of residual echo signal corresponding to the at least one approximation speaker echo estimate signal, and (iv) combines the at least one estimate of residual echo signal with the at least one echo-suppressed microphone signal to provide the output signal.

BRIEF DESCRIPTION OF THE DRAWINGS

FIG. 2a is a diagrammatic illustration of desired microphone signals.

FIG. 2b is a diagrammatic illustration of audio undesired echo signals.

FIG. 3 is a diagrammatic example of a further embodiment of the present invention.

FIGS. 5a and 5b are, respectively, prior art illustrative diagrams of primary AEC and secondary AEC functionality.

FIGS. 6a and 6b are concept illustrations of improved secondary echo processing.

FIGS. 7a, 7b, 7c, 7d, 7e and 7f are structural and functional diagrams of the audio system incorporating the primary AEC processor and a secondary echo suppression processor, according to an embodiment of the present invention.

FIG. 9 is a capture of test results, of current art compared to an embodiment of the present invention.

DETAILED DESCRIPTION

Figure 1:
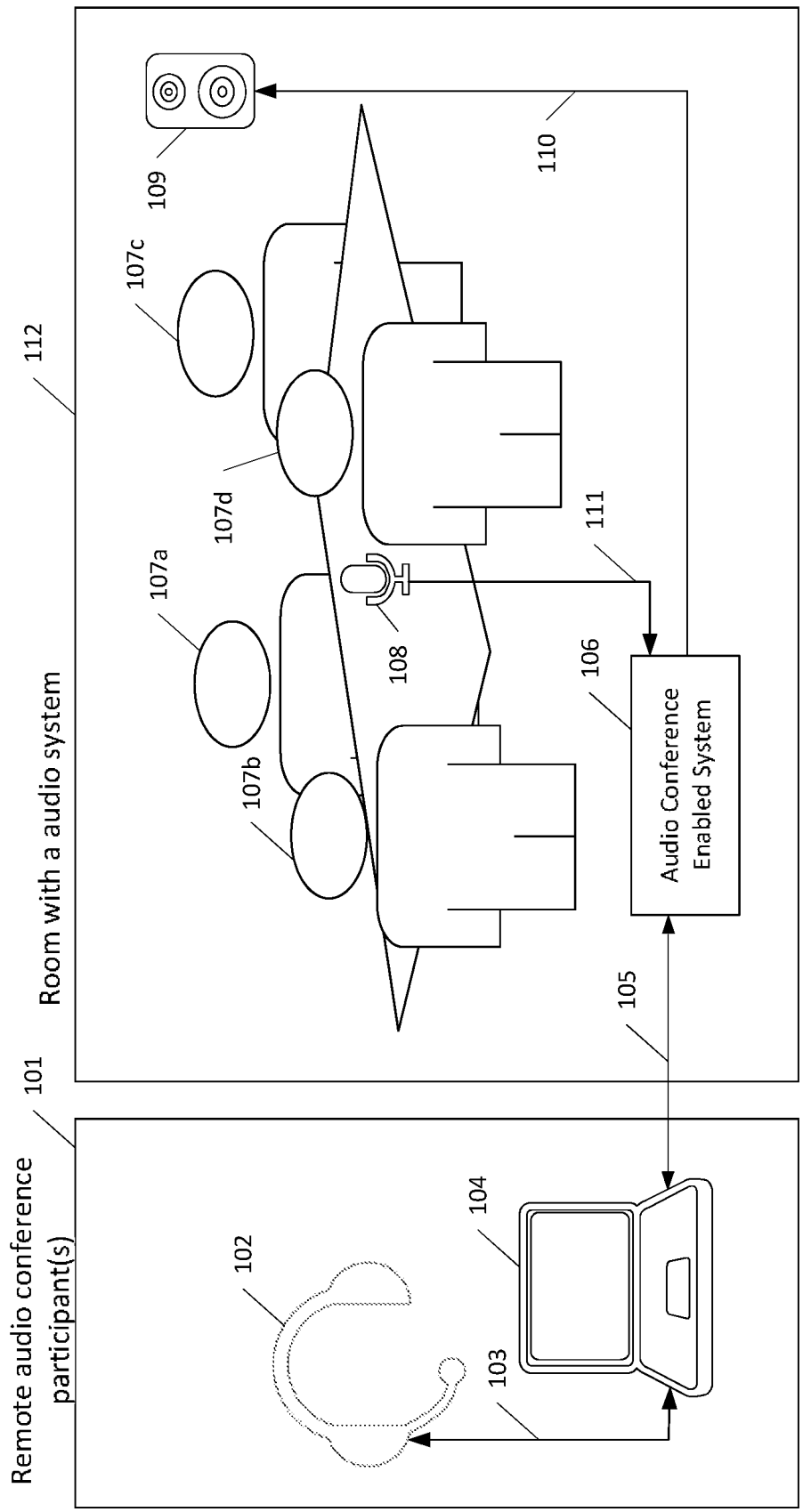
FIG. 1 is a diagrammatic illustration of a typical audio conference setup.

The present invention is directed to apparatus and methods that enable groups of people (and other sound sources, for example, recordings, broadcast music, Internet sound, etc.), known as "participants", to join together over a network, such as the Internet or similar electronic channel(s), in a remotely-distributed real-time fashion employing personal computers, network workstations, audio conference enabled equipment and/or other similarly connected appliances, often without face-to-face contact, to engage in effective audio conference meetings that utilize multi-user rooms (spaces) with distributed participants.

Advantageously, embodiments of the present apparatus and methods afford an ability to provide all participants an end user experience having all sound sources transmitted with significantly reduced return echo signals, regardless of the number potential return echo signals created, while maintaining optimum audio quality for all conference participants.

A notable challenge to eliminating system return echo is the complex speaker to-microphone signal relationships that are formed in combination with changing characteristics present in reverberant rooms, people or objects moving about in the room, and the potential presence of double talk, resulting in a wide range of situations to anticipate and calibrate for, while maintaining appropriate adaptive echo canceller coefficients and compensation factors which affect the audio sound quality for all participant(s) on the audio call.

A "conference enabled system" in this specification may include, but is not limited to, one or more of, an combination of device(s) such as, UC (unified communications) compliant devices and software, computers, dedicated software, audio devices, cell phones, a laptop, tablets, smart watches, a cloud-access device, and/or any device capable of sending and receiving audio signals to/from a local area network or a wide area network (e.g., the Internet), containing integrated or attached microphones, amplifiers, speakers and network adapters. PSTN, Phone networks etc.

A "microphone" in this specification may include, but is not limited to, one or more of, any combination of transducer device(s) such as, condenser mics, dynamic mics, ribbon mics, USB mics, stereo mics, mono mics, shotgun mics, boundary mic, small diaphragm mics, large diaphragm mics, multi-pattern mics, strip microphones, digital microphones, fixed microphone arrays, dynamic microphone arrays, beam forming microphone arrays, and/or any transducer device capable of receiving acoustic signals and converting to electrical signals, and or digital signals.

A "communication connection" in this specification may include, but is not limited to, one or more of or any combination of analog signal connections; local communication interface(s) such as memory buffer(s), queues, named pipes, etc.; digital network interface(s) and devices(s) such as, WIFI modems and cards, internet routers, internet switches, LAN cards, local area network devices, wide area network devices, PSTN, Phone networks etc.

A "device" in this specification may include, but is not limited to, one or more of, or any combination of processing device(s) such as, a cell phone, a Personal Digital Assistant, a smart watch or other body-borne device (e.g., glasses, pendants, rings, etc.), a personal computer, a laptop, a pad, a cloud-access device, a white board, and/or any device capable of sending/receiving messages to/from a local area network or a wide area network (e.g., the Internet), such as devices embedded in cars, trucks, aircraft, household appliances (refrigerators, stoves, thermostats, lights, electrical control circuits, the Internet of Things, etc.).

An "engine" is preferably a program that performs a core function for other programs. An engine can be a central or focal program in an operating system, subsystem, or application program that coordinates the overall operation of other programs. It is also used to describe a special-purpose program containing an algorithm that can sometimes be changed. The best-known usage is the term search engine which uses an algorithm to search an index of topics given a search argument. An engine is preferably designed so that its approach to searching an index, for example, can be changed to reflect new rules for finding and prioritizing matches in the index. In artificial intelligence, for another example, the program that uses rules of logic to derive output from a knowledge base is called an inference engine.

As used herein, a "server" may comprise one or more processors, one or more Random Access Memories (RAM), one or more Read Only Memories (ROM), one or more user interfaces, such as display(s), keyboard(s), mouse/mice, etc. A server is preferably apparatus that provides functionality for other computer programs or devices, called "clients." This architecture is called the client-server model, and a single overall computation is typically distributed across multiple processes or devices. Servers can provide various functionalities, often called "services", such as sharing data or resources among multiple clients, or performing computation for a client. A single server can serve multiple clients, and a single client can use multiple servers. A client process may run on the same device or may connect over a network to a server on a different device. Typical servers are database servers, file servers, mail servers, print servers, web servers, game servers, application servers, and chat servers. The servers discussed in this specification may include one or more of the above, sharing functionality as appropriate. Client-server systems are most frequently implemented by (and often identified with) the request-response model: a client sends a request to the server, which performs some action and sends a response back to the client, typically with a result or acknowledgement. Designating a computer as "server-class hardware" implies that it is specialized for running servers on it. This often implies that it is more powerful and reliable than standard personal computers, but alternatively, large computing clusters may be composed of many relatively simple, replaceable server components.

The servers and devices in this specification typically use the one or more processors to run one or more stored "computer programs" and/or non-transitory "computer-readable media" to cause the device and/or server(s) to perform the functions recited herein. The media may include Compact Discs, DVDs, ROM, RAM, solid-state memory, or any other storage device capable of storing the one or more computer programs.

A "signal" in this specification refers to a digital representation of an analog microphone or speaker signal as a voltage (v) or power (dB) for purposes of digital signal processing. Other digital signals such as echo, or power estimates may be generated or derived from microphone or speaker signals as necessitated by processing requirements. Digitally processed audio signals are generally described in terms of standard sample rates (8 kHz, 24 kHz, 44.1 kHz, 48 kHz, 96 kHz, 192 kHz and higher) and format (16-bit Pulse Coded Modulation, 32-bit PCM, and others). Algorithms and processing detailed in this specification apply to signals processed at any sample rate and may be performed using floating-point or fixed-point calculations at 16-bit, 32-bit, 64-bit or other precision based on requirements of the specific process or operation employed in the audio processing chain with no adverse effect on the invention.

FIG. 1 is illustrative of a typical audio conference scenario with a remote user 101 communicating with a shared space conference room 112. The purpose of this illustration is to portray a typical scenario in which audio echo cancelation may be required. For clarity purposes, a single remote user is illustrated. However, it should be noted that there may be a plurality of remote users connected to the conference system which can be located anywhere a communication connection is available. The addition of incremental remote users increases the opportunity for system audio return echoes to develop and propagate through the conference call potentially creating low quality audio performance and feedback especially for the remote users who are listening and not verbally talking (muted).

The remote user 101 may utilize a laptop computer device 104 connected with audio cables 103 to a headset 102. Utilization of a headset 102 will minimize the chance of an echo signal being generated at the remote user 101 far-end. If the remote user 101 choses to use the built-in microphone and speaker into the laptop computer device 104, the opportunity for a return echo signal to be generated is significantly increased at the far end as there is minimal pathloss isolation between the built-in speaker and microphone. The remote user 101 can use any audio conference enabled system. The laptop computer device would typically run a UC (Unified Communications) client software, and or hardware device.

The conference room 112 preferably contains an audio conference enabled system 106 that is connected via digital or analog connections 110 to a speaker system 109 and connected via digital or analog connections 111 to a microphone system 108. The in-room speaker system for the purpose of simplicity is shown as a single speaker 109 unit, however any number of speaker units is supported as illustrated in FIG. 4c. The in-room microphone system for the purpose of simplicity is shown as a single microphone 108 unit, however any number of microphone units is supported as illustrated in FIG. 4b. The speaker system 109 and the microphone system 108 may be installed in any number of locations and anywhere in the room. It should be noted that microphone 108 and speaker 109 systems are often integrated in the same device such as in table top devices and or wall mounted integrated enclosures FIG. 3 or any combination thereof and is within the scope of this disclosure.

There are notionally four participants illustrated in the room, Participant 1 107a, Participant 2 107b, Participant 3 107c and Participant 4 107d. Participant(s) and sound source(s) and desired sound sources(s) can and will be used interchangeably and in this context, mean substantially the same thing. Each participant illustrates, but is not limited to, an example of desired sound sources within a room 112.

The remote user 101 and the conference room 112 are connected via a communication connection 105. The audio conference enabled system 106, is any device and/or software combination that supports audio conference capabilities and is within the scope of this invention.

FIG. 2a illustrates an example of desired audio sound sources signals 202a, 202b, 202c, and 202d from participants 107a, 107b, 107c, and 107d, respectively, being picked up by the audio conference system 106 through the microphone system 108. The audio conference system 106 will transmit the audio sounds sources 202a, 202b, 202c, and 202d to the remote user 101 via the communications connection 105. The audio conference enabled computer 104 will transmit to the headphones 102 the desired sound sources 201 to the remote user via the headset 102. In this illustration the remote user is not talking (muted) and as a result there is no sound emanating from the speaker system 109 resulting in no return echo signal 203,206 being present in the remote users 101 headset 102 speaker 201 to cancel.

FIG. 2b illustrates how a system return echo signal is created which affects the remote user 101 conference experience. If system return echo is allowed to persist the audio conference system 106 will be driven to feedback saturation (howling) in a worst-case scenario that can damage the equipment and to a lesser scenario the remote user constantly hears their own voice (system return echo) through the headset 102 speakers 201. If there are multiple remote users all remote users will hear the original voice from remote user 101 and the echo return signal time delayed in their headset thus degrading the audio conference experience.

A return echo signal is created by the remote user 101 talking into their headset 102 microphone 205. This creates the initial audio signal that gets fed through the audio conference systems 104, 106. The audio signal travels from the UC enabled laptop computer 104 through the communications connection 105 to the conference room 112 audio conference system 106. The audio conference system 106 will communicate 110 to the speaker system 109 which will audibly transmit the remote user 101 voice 205 to the conference room participants 107a, 107b, 107c, 107d. In addition to the conference room participants the speaker system 109 will also transmit the remote users 101 audio voice 205 to the audio conference 106 microphone system 108 through direct path 206 and reflected path (reverberations) 203 audio signals. It is this transmission back through the microphone system 108 through communication path 111 that establishes an undesired return echo signal. If the return echo signal 203 goes unprocessed, feedback will occur through the audio conference system 106, 104 back to the remote user 101 and heard through the headset 102 through the speakers 201. Only one reverberant path signal 203 is shown for clarity however it should be noted that there are often a plurality of reverberant signals 203 picked up by the system microphone 108. The number of reverberant signals 203 picked up by the microphone system 108 is dependent on many factors for example but not limited to the speaker system 109 volume, room reflective characteristics and position of the microphones 108 in relation to the speakers 109. It is this combination of factors that make return echo 201 so difficult to eliminate in the desired audio pickup signal.

The situation where any number of the participants 107a, 107b, 107c, and 107d are talking (desired signal) 202a, 202b, 202c, and 202d and the remote user 101 is also talking (undesired signal) 203, 206 at the same time creates a situation known as double talk. Since all signals 202a, 202b, 202c, 202d, 206, 203 are received at the microphone system 108 at the same time the audio system 106 desirably filters out the return echo signals (undesired signals) 203, 206 while maintaining the integrity of the desired signals 202a, 202b, 202c, 202d. This is a complex signal and has proven difficult to filter adequately and can compromise echo canceller adaptive settings and resulting performance. A highly reverberant conference room 112 will result in an even more complex return echo signal 201 due to increased absorption and distortion of the signal upon every reflection; this has proven difficult to solve adequately in the current art of primary stage echo cancellation with secondary stage echo reduction as the effect of physical room characteristics is unknown to the secondary echo reduction processor.

Almost all audio conference systems in the current art have implemented primary and secondary stage echo cancellers and reducers to deal with the return echo signal problem, however they have proven insufficient to solve the problem of conference call echo satisfactorily under all real-life situations.

FIG. 3 is an illustration of an embodiment of the invention that is configured to support a microphone speaker bar 315 combination. The microphone speaker bar 315 preferably comprises a microphone system and a plurality of speakers 317a, 317b. The plurality of speakers 317a, 317b and microphones 108 contained in the microphone array 316 can create a large number of return echo signals to be cancelled. Having the microphones 108 built into a microphone array 316 and integrated in to the same enclosure 315 as the speakers 317a, 317b further establishes the need for a proper echo canceller solution as the physical coupling and close proximity between the speakers 317a, 317b and microphone array 316 can create larger echo signals to cancel due in part to minimal free air path loss attenuation. The generic audio conference system has been substituted with a laptop computer 313 running a UC audio conference client and connected to the microphone speaker bar 315 through a digital and/or analog communication interface 314 and is considered within scope of the disclosure.

Figure 4A:
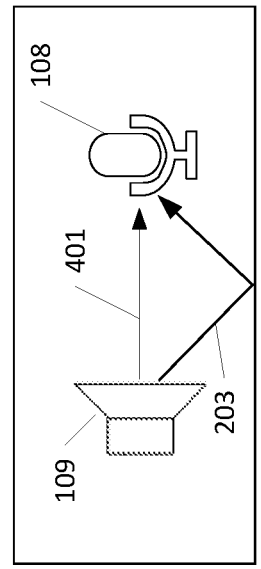
FIGS. 4a, 4b, 4c and 4d are illustrative examples of microphone to speaker echo relationships.
Figure 4B:
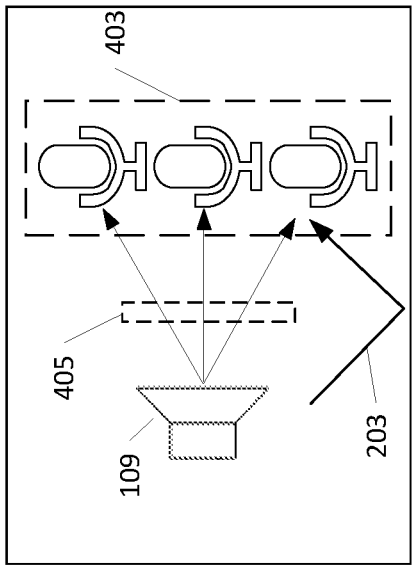
Figure 4C:
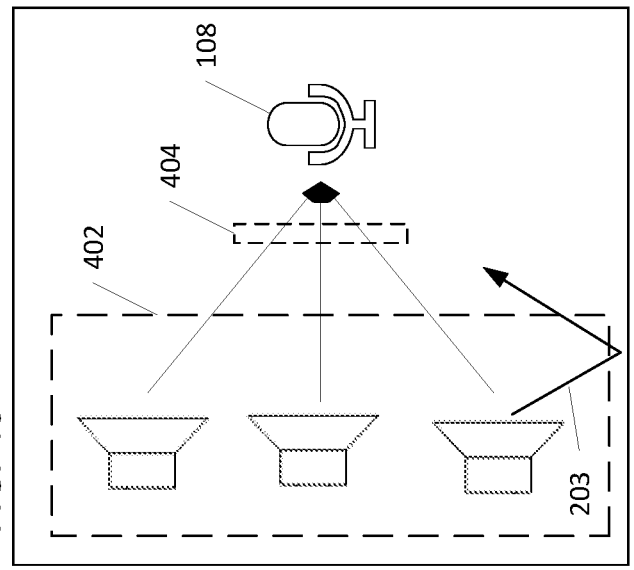
Figure 4D:
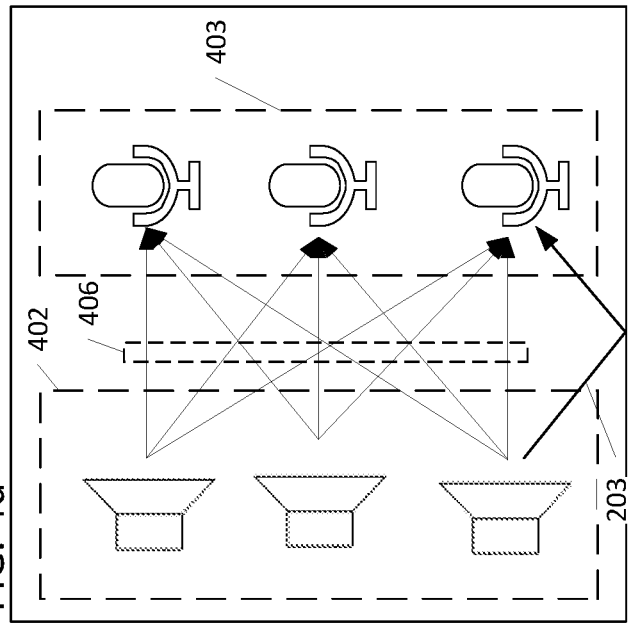

FIGS. 4a, 4b, 4c and 4d illustrate the complex echo signal relationships 401, 404, 405, 406 that are formed between a microphone system 108 and the speaker system 109. Any number of microphone 108, 403 and speaker 109, 402 combinations are supported within preferred embodiments of the invention. FIG. 4a illustrates a single speaker 109 and single microphone 108 combination. Although one audio signal path 401 is shown for the purpose of illustration it should be noted that there is a direct path signal 401 and a plurality of reflected paths signals 203 for each microphone 108 and speaker 109 combination. It is this plurality of reflected path signals 203 that make dealing with return echo signals problematic. In effect, each reflected speaker signal arrives back at the microphone system at a slightly different time delay and amplitude causing multiple return echo signals in the microphone 108 pickup signal. Echo canceler systems should try to take into account the complex return echo signal received and reduce it below the desired signal as much as possible. FIGS. 4b, 4c, and 4d show the more complex echo signal relationships that develop as more microphones 108 and speakers 109 are added to the conference room 112. Each of these combinations increases the complexity of the echo return signals that the echo canceller must deal with. For example, in FIG. 4b the system is set up with one speaker 109 and three microphones 403. At a minimum there will be three direct signal path 401 return echo signals to cancel out. In actuality, there will be significantly more reflected path signals 203 that will be unique to each microphone 108 and speaker 109 combinations based on speaker 109 levels and the position of the microphones 108 in the shared space 112 relative to the speakers 109. It is because of this type of situation that generic secondary echo suppressors are not sufficiently adequate to deal with complex situations. FIGS. 4c and 4d further illustrate this problem. FIG. 4c illustrates the installation of three speakers 402 and one microphone 108 which is the inverse of the previous setup in FIG. 4b. The same complexities apply here as well. FIG. 4d is an illustration of the most complex situation where multiple microphones 402 and multiple speakers 403 are installed creating many direct path 206 and reflected path 203 echo return signals. It should be noted that, as the volume is increased through the speakers 109, the number of echo return path signals increase as the increased signal sound volume over comes the pathloss attenuation to the microphone 108 such that the microphone 108 is able to pick up reflected signals 203 that are further delayed in time, and the echo canceler would need to be adjusted accordingly There have been numerous attempts in the prior art to deal with this complex problem with limited success due to limitations imposed by the signals typically available during secondary processing; these signals comprising the original speaker output and echo cancelled microphone signals. Such methods have attempted to estimate undesired residual echo signals by utilizing the speaker input signal and/or the in-room noise signal levels to estimate a room transfer function in the second stage echo reduction processor.

FIG. 5a illustrates first stage echo processing 501 typical in current art audio devices. This approach entails using the input speaker signal 500 and the room's measured impulse response data to generate an estimation of the speaker echo signal 512 expected to be received in the raw system microphone signal 504. The impulse response data is known to people skilled in the art and typically refers to the room transfer function which is obtained through various methods and techniques where an impulse response signal is sent through the speakers 109 and picked up via the microphone 108 system which measures the systems impulse response. This is typically accomplished through a calibration phase. The Echo Estimate processor 505 utilizes the measured impulse response (time delayed signal) contains the direct path and reflected path information which is then used by the echo canceller 501 and is referred to as the AEC estimation signal 512. The raw microphone signal 504 is comprised of several components: undesired speaker signal 206 plus undesired noise signal 502 and desired in-room signal 202:

Raw Microphone signal=Desired in-room signal+ Undesired Noise signal+Undesired Speaker signal     (1)

The estimated speaker echo signal 512 is subtracted 506 from the raw microphone signal 504 yielding the echo cancelled microphone signal 507 as output from the Primary Echo Canceller (e.g., canceller and/or suppressor and/or reducer and/or attenuator and/or minimizer) 501.

Echo Cancelled Microphone=Raw Microphone signal−Estimated Speaker Echo signal     (2)

The room response (room transfer function) to the speaker signal 500 will vary depending on room size, layout, temperature, air pressure, and presence or movement of people and objects within the room 112. Due to these variations, limitations in the first stage AEC processing (i.e. filter length, data precision, etc.) and non-linearities in the amplifier circuits and physical speaker characteristics, there will be errors in the echo estimate 512 caused by over or under estimation of the echo return signal; this results in a residual echo component present in the echo cancelled microphone signal 507. If the residual echo signal is passed into the audio-conferencing system 106, the undesired echo signal may continue to build on itself resulting in poor audio quality and possible feedback. The resultant echo cancelled microphone signal 507 is comprised of the desired in-room signal 202 plus the undesired noise signal 502 and the undesired residual echo signal.

Echo Cancelled Microphone=Desired in-room signal+Undesired noise signal+Undesired residual echo signal     (3)

FIG. 5b shows the typical interaction between a Primary Echo Canceller 501 and Second Stage Echo Reduction 511 processing in current art audio systems. Generally, second stage echo reduction 511 processing is optional and may be performed in software (such as Skype) or hardware audio processors with no knowledge of the processing performed in the primary echo cancelation device 501. An important limiting factor is that the secondary echo processor has only the speaker signal 500 and echo cancelled microphone signal 507 to reference when estimating 508 the residual echo signal 513. The problem with this approach is the second stage echo reduction processor 511 must estimate the residual echo portion of microphone signal 507 without knowing the impulse response of the room (room transfer function) which was calculated prior to estimation of the original echo response 505 in the primary echo canceller 501. This results in a residual echo estimate 513 that is prone to larger errors and thus poorer performance in both echo reduction and preservation of desired in-room signal 202. Paper 3 describes this problem and illustrates one approach for dealing with residual echo signals by implementing a secondary echo suppression processor utilizing the far-end speaker signal.

There are two possible outcomes of poor echo reduction performance: underestimation and overestimation of residual echo. In the case of underestimating residual echo, the impact to audio conferencing systems 106 is a residual echo signal fed back into the system which can continue to build if proper echo reduction cannot be achieved at both ends of a conferencing call. The second outcome, where the residual echo signal 513 is overestimated, causes degradation of the desired in-room signal 202 by subtracting 509 too much speaker signal 500 from the echo cancelled microphone signal 507 resulting in the second stage echo processor output signal 510 containing distortion and unintelligible speech.

Processed Microphone signal=Echo Cancelled Microphone−Estimated Residual Speaker Echo signal     (4)

FIG. 6a details a preferred embodiment of the invention which improves Second Stage Echo Reduction 704 by sending the Estimated Speaker Echo signal 512 from the Primary Echo Canceller 705 to the Secondary Echo Reduction processor 508. The primary echo cancellation processer 505 uses the room's impulse response data (room transfer function) to transform the speaker signal 500 into an estimate of the expected speaker echo signal 206 transmitted to the microphone 108. As described in previous sections FIGS. 5a and 5b regarding current art processing, the echo cancelled microphone signal 507 includes a residual speaker echo component which is a result of either over or under estimating the echo signal. These errors in estimation result from changes in room performance due to environmental changes or addition/movement of equipment and people. The central premise of the preferred embodiments is that the source of the residual echo signal (errors in estimation) more closely corresponds to the original echo estimate 512 than the original speaker signal 500. By utilizing the primary echo canceller's speaker echo estimate 512 instead of the original speaker signal 500 at the estimate of residual echo processor 508, the output signal 600 of the estimate of the residual echo processor 508 can be subtracted 509 from the echo cancelled microphone signal 507 resulting in echo reduction processing that can be improved by over 4.5 dB at the output 510 of the second stage echo processor 704 in a typical reverberant room as illustrated by waveforms captured and illustrated in FIG. 9.

FIG. 6b details another embodiment of the invention which improves Second Stage Echo Reduction 704 by utilizing the raw microphone 504 and echo cancelled microphone 507 signals to derive an approximation of the speaker echo estimate 514 by subtracting 513 the echo cancelled microphone signal 507 from the raw microphone signal 504. This method will yield results similar to utilizing the primary echo canceller's speaker echo estimate 512 when generating the residual echo estimate.

FIG. 7a is a structural and functional diagram illustrating a preferred embodiment showing how the system can be scaled to a plurality of speaker/microphone configurations to more general cases of microphone arrays. These microphone arrays may comprise multiple speakers for output 109 and multiple microphones 108 for input, with each microphone 108 employing an echo estimation processor 505 that receives a signal 500 for every speaker 109 with the raw microphone signal 504 and generates an estimated speaker echo signal 512. The echo estimation processor also provides the estimated echo response 512 to the Primary Echo Canceller 705 which is, in turn, provided to the Second Stage Echo Reduction processor 704. In this embodiment, there remains two logical stages in processing the echo signal but the two stages are combined in a single physical device with the outputs of the Second Stage Echo Reduction units 704 aggregated 701 to provide a composite Processed Microphone signal 510. Other embodiments may be realized by changing the physical arrangement of the processing and aggregation units; one of which is illustrated in FIG. 7e.

FIG. 7b details the preferred embodiments' modified signal flow through the Primary Echo Canceller 705. The main components in the diagram include a linear filter 7055, an adaptive algorithm (or engine) 7056 for controlling the filter, a means for generating an estimate of the noise component 7051 of the microphone signal 504 output as noise floor signal 7054, and the echo cancelled microphone signal 507 which is the result of subtracting 7053 the first stage echo estimate signal 512 from the raw microphone signal 504. A notable component in FIG. 7b is providing the estimated speaker echo signal 512 as an output to the next stage.

FIG. 7c illustrates details of the Second Stage Echo Reduction processor 704. This preferred embodiment includes an optional noise reduction/suppression mechanism 7043 and 7047. The input signals to the Second Stage Echo and Noise Reduction processor 704 (noise floor signal 7054, echo cancelled microphone signal 507, and estimated speaker echo signal 512) are preferably processed using a short-time Fourier transform (STFT) 7041, 7044 and 70410 in order to continue processing in the frequency domain. In the preferred implementation, processing in the frequency domain is performed using 128 sub-bands over a 12 kHz spectrum. Details of the second stage processing are as follows:

$P_{Nk}^{(n)}$ 7043 is the noise floor power estimate for frame n, frequency sub-band k. The smoothed noise power estimate can be expressed as $$P_{Nk}^{(n)} = \alpha P_{Nk}^{(n-1)} + (1-\alpha)|N_k^{(n)}|^2, \ k=0,1,\ldots K \tag{5}$$

Where K is the total number of sub-bands and a is the forgetting factor (which determines how quickly a filter forgets past training and adapts to current data) from 0 to 1 with a typical value of 0.95. $N_k^{(n)}$ is the noise frequency component for frame n and sub-band k. An example algorithm to estimate the noise floor power was proposed by R. Martin, "Spectral Subtraction based on minimum statistics", Proc. EUSIPCO-94, pp 1182-1185, Edinburgh, 1994. $|N_k^{(n)}|$ is the absolute 7042 value (amplitude) of $N_k^{(n)}$.

After the echo cancelled microphone signal 507 is transformed to the frequency domain 7044, the signal is further transformed 7045 from a complex signal (rectangular system) into its phase and amplitude (polar system) components. $P_{Mk}^{(n)}$ 7046 is the echo cancelled microphone signal 507 (first stage AEC output signal) power estimate for frame n, frequency sub-band k. The smoothed AEC output power estimate can be expressed as $$P_{Mk}^{(n)} = \alpha P_{Mk}^{(n-1)} + (1-\alpha)|M_k^{(n)}|^2, \ k=0,1,\ldots K \tag{6}$$

Where K is the total number of sub-bands and α is the forgetting factor (which determines how quickly a filter forgets past training and adapts to current data) from 0 to 1 with a typical value of 0.95. $M_k^{(n)}$ is the first stage AEC output signal frequency components for frame n and sub-band k consisting of local voice signal (useful signal), background noise and echo residual leaked from first stage AEC. $|M_k^{(n)}|$ 7045 is the absolute value (amplitude) of $M_k^{(n)}$ and $\varphi_{Mk}^{(n)}$ is the phase of $M_k^{(n)}$.

$P_{Xk}^{(n)}$ 70412 is the residual echo power estimate for frame n, frequency sub-band k. The smoothed residual echo power estimate can be expressed as $$P_{Xk}^{(n)} = \alpha P_{Xk}^{(n-1)} + (1-\alpha)(\hat{X}_k^{(n)})^2, \ k=0,1,\ldots K \tag{7}$$

Where K is the total number of sub-bands and a is the forgetting factor from 0 to 1 with a typical value of 0.95.

$\hat{X}_k^{(n)}$ is the residual echo estimate adaptive filter output for frame n, frequency sub-band k and can be expressed as:

$$\hat{X}_k^{(n)} = \sum_{l=0}^{L-1} |X_k^{(n)}(l)|H_k^{(n)}(L-1-l) \tag{8}$$

Where 70411 $|X_k^{(n)}(l)|(l=0, 1, \ldots L-1)$ is the amplitude of the first stage echo estimate signal for frame n-1 and the vector format is:

$$|X_{kL}^{(n)}|=[|X_k^{(n)}(0)|,|X_k^{(n)}(1)|,\ldots |X_k^{(n)}(L-1)|] \tag{9}$$

$E_k^{(n)}$ 704121 is the residual estimate error signal and can be expressed as $$E_k^{(n)}=|M_k^{(n)}|-\hat{X}_k^{(n)} \tag{10}$$

The adaptive residual echo estimate filter coefficients 704123 with L taps are updated as follows for kth sub-band:

$$H_{kL}^{(n+1)} = H_{kL}^{(n)} + \mu \frac{E_k^{(n)}|X_{kL}^{(n)}|}{P_{Xk}^{(n)}} \tag{11}$$

Where μ is the step size for the adaptive filter coefficient updating, and $H_{kL}^{(n)}$ can be expressed as $$H_{kL}^{(n)}=[H_k^{(n)}(0),H_k^{(n)}(1),\ldots H_k^{(n)}(L-1)] \tag{12}$$

$W_k^{(n)}$ 7047 is the extended Wiener filter gain for frame n, frequency sub-band k and is expressed as $$W_k^{(n)} = \frac{P_{Mk}^{(n)} - P_{Xk}^{(n)} - P_{Nk}^{(n)}}{P_{Mk}^{(n)}} \tag{13}$$

Output from the extended Wiener filter is combined with the previously saved phase information (polar system) and transformed 7048 back to a complex (rectangular system) signal. $Y_k^{(n)}$ 7048 is the signal output after echo suppression and noise reduction for frame n, frequency sub-band k and is expressed as $$Y_k^{(n)}=W_k^{(n)}|M_k^{(n)}|\exp(j\varphi_{Mk}^{(n)}) \tag{14}$$

$y^{(n)}$ 7049 is the nth frame time domain output signal and is calculated from the inverse STFT 7049 $y^{(n)}=\text{STFT}^{-1}(Y^{(n)}) \ldots (15)$, where $Y^{(n)}=[Y_0^{(n)}, Y_1^{(n)}, \ldots Y_{K-1}^{(n)}]$.

FIG. 7d provides details of the Residual Echo Power Estimate processor 70412. The adaptive algorithm 704124 utilizes the first stage echo estimate signal $|X_k^{(n)}|$ for frame n frequency sub-band k plus the residual echo estimate adaptive filter output $E_k^{(n)}$ for frame n, frequency sub-band k to control the linear filter 704123 $H_k^{(n)}$ and generate a new estimation of the residual echo signal which is output from the adaptive filter 704123. The final processing step is to generate a smoothed residual echo power estimate $P_{Xk}^{(n)}$ 704122 for input to the Extended Weiner Filter 7047.

FIG. 7e illustrates another embodiment of the invention differing from FIG. 7a in how the Primary Echo Canceller unit 705 and Second Stage Echo Reduction unit 704 are physically separated yet able to provide the same improvement due to the inclusion of the estimated speaker echo signal 512. In this case, the echo cancelled microphone signals 507 and estimated speaker echo signals 512 are aggregated 701 and passed 512a and 507a to the Second Stage Echo Reduction unit 704. The inclusion of the estimated speaker echo signal 512*a* may be provided by means of an additional logical data stream over an existing physical interface or as an additional stream utilizing a wholly separate physical interface. In this embodiment, with either physical implementation, the invention provides the same improvement in echo reduction capability. In this distributed architecture the second stage echo reduction 704 can be implemented in standalone hardware and software applications without deviating from the invention. On the contrary, it is within the capability of standard interfaces known in the art to support the transmission of the estimated speaker signal 512 enabling the inclusion of estimated speaker signals 512 in common distributed and separated functionally second stage echo reduction units.

FIG. 7*f* illustrates a different embodiment of the invention than FIGS. 7*a* and 7*e* in how the Primary Echo Canceller unit 705 and Second Stage Echo Reduction unit 704 are physically separated yet able to provide the same improvement due to the inclusion of the raw microphone signal 504. In this case, the echo cancelled microphone signals 507 and the raw microphone signals 504 are aggregated 701 and passed 504*a* and 507*a* to the Second Stage Echo Reduction unit 704. The inclusion of the raw microphone signal 504*a* may be provided by means of an additional logical data stream over an existing physical interface or as an additional stream utilizing a wholly separate physical interface. In this embodiment, with either physical implementation, the invention provides the same improvement in echo reduction capability.

Figure 8:
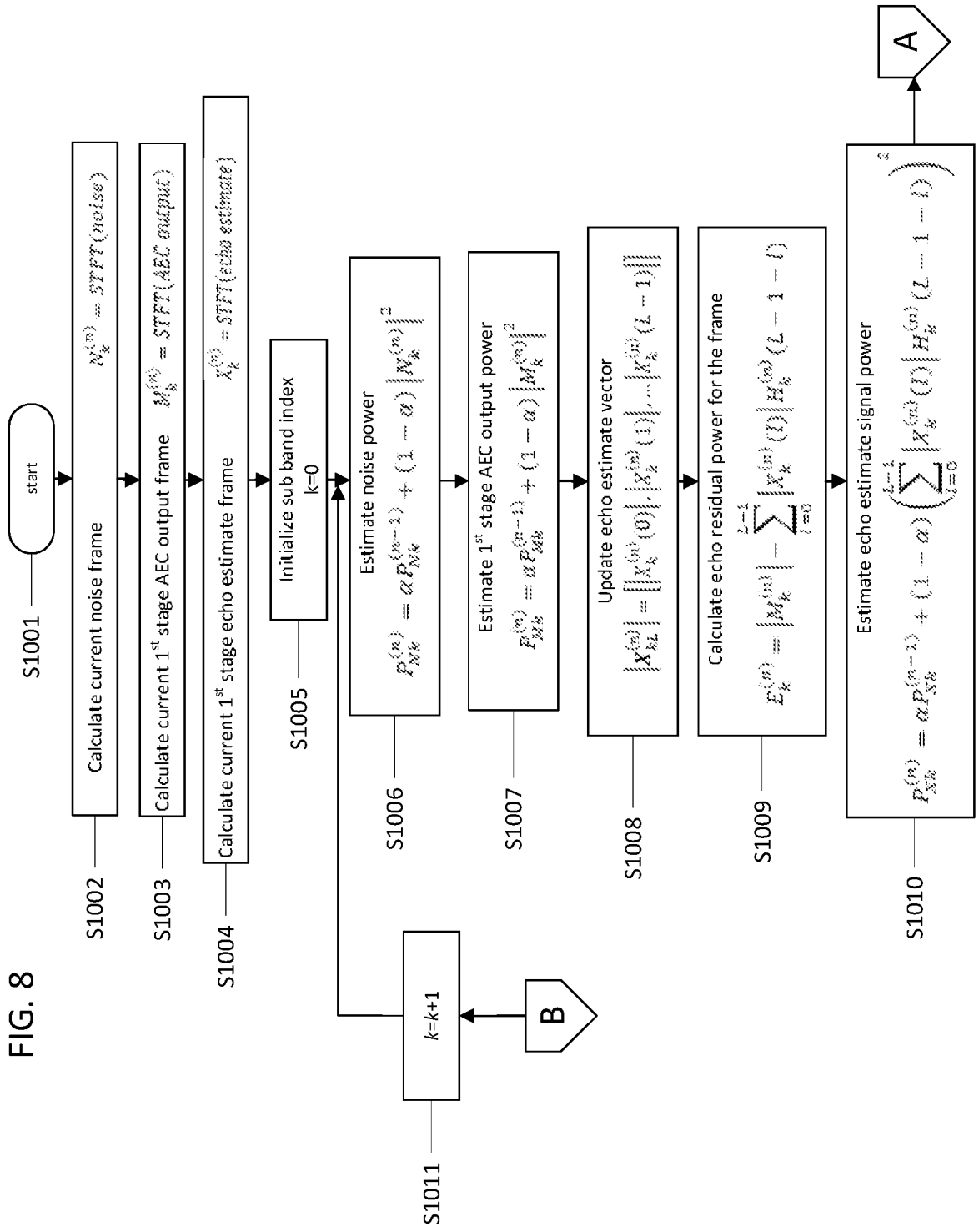
FIG. 8 is a logic flowchart of the residual echo suppression and reduction functionality.
Figure 8:
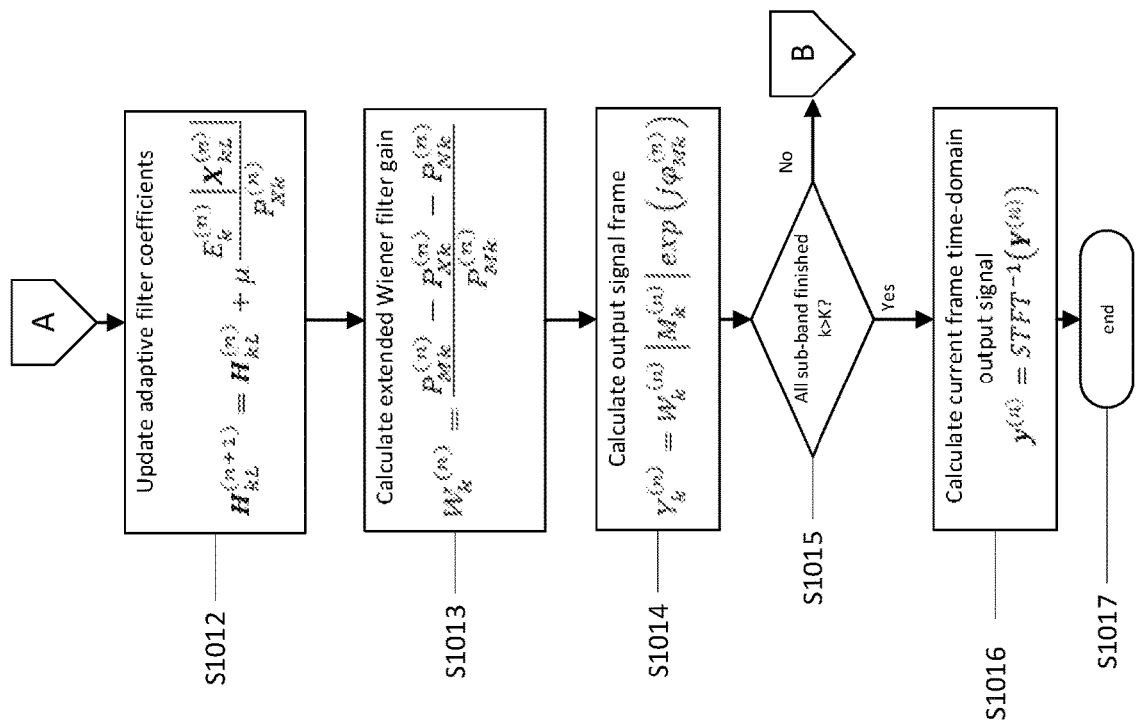

FIG. 8 describes the logic flow for the Residual Echo and Noise Reduction processor. The steps are described below:

S1001—start the Second Stage Echo and Noise Reduction for the current frame.

S1002—calculate the discrete-time Short Time Fourier Transform (STFT), $N_k^{(n)}$, for the time domain noise floor signal frame received from the Primary Echo Canceller (7054). n is the current frame index, and K is the size of the STFT, for this embodiment 256.

S1003—calculate the discrete-time Short Time Fourier Transform (STFT), $M_k^{(n)}$, for the time domain first stage AEC output signal frame received from the Primary Echo Canceller (507). n is the current frame index, and K is the size of the STFT, we choose 256.

S1004—calculate the discrete-time Short Time Fourier Transform (STFT), $X_k^{(n)}$, for the time domain echo estimate signal frame received from the Primary Echo Canceller (512). n is the current frame index, and K is the size of the STFT, we choose 256.

S1005—initialize the loop variable for the sub-bank index k which goes from 0 to K−1.

S1006—calculate the kth sub-band smoothed noise floor power estimate, $P_{Nk}^{(n)}$, from current frame noise floor STFT (S1002). α is the forgetting factor and we choose 0.95

S1007—calculate the kth sub-band smoothed signal power estimate, $P_{Mk}^{(n)}$, from current frame primary stage AEC output STFT (S1003). α is the forgetting factor and we choose 0.95

S1008—update the echo estimate vector for each sub-band frequency component (amplitude), $$|X_{kL}^{(n)}|=[|X_k^{(n)}(0)|,|X_k^{(n)}(1)|, \ldots |X_k^{(n)}(L-1)|] \quad (16)$$

Discard the oldest one ($|X_k^{(n)}(0)|$) and add on the newest one ($|X_k^{(n)}(L-1)|$) (S1004).

S1009—calculate the kth sub-band echo residual signal $E_k^{(n)}$ which is the residual adaptive filter (704123) output subtract from the first stage AEC output signal $|M_k^{(n)}|$ S1010—calculate the kth sub-band smoothed echo estimate signal power, $P_{Xk}^{(n)}$, from current frame echo estimate frame (S1009). α is the forgetting factor and we choose 0.95

S1011—increase the sub-band frequency index k for next calculation loop.

S1012—update the echo residual adaptive filter coefficients with normalized gradient for next frame $H_{kL}^{(n+1)}$. μ is a small number as the adaptive filter step size, we choose 0.005. $H_{kL}^{(n)}$ is the adaptive FIR filter coefficients with L taps $H_{kL}^{(n)}=[H_k^{(n)}(0), H_k^{(n)}(1), \ldots H_k^{(n)}(L-1)]$ S1013—calculate the extended Wiener filter gain, $W_k^{(n)}$, for kth sub-band frequency component.

S1014—calculate the complex output signal, $Y_k^{(n)}$, for the kth sub-band component by applying the Wiener filter gain to the first stage AEC output signal amplitude $|M_k^{(n)}|$, and restore its phase $\varphi_{Mk}^{(n)}$.

S1015—repeat from S006 to S1014 until all the sub-bank frequency component has been calculated.

S1016—calculate current frame time-domain output signal $y^{(n)}=\text{STFT}^{-1}(Y^{(n)})$ S1017—finish the current frame calculation.

FIG. 9 is a graphical capture of test results demonstrating the results of a preferred embodiment of the invention under specific test conditions. The testing was performed in a reverberant room with minimal acoustic treatment using an integrated microphone array and speaker bar 315 mounted approximately 7.5 feet (2.3 m) from the floor. Testing was performed using open source audio capture and measurement tool Audacity on a Windows computer system to send a USB (Universal Serial Bus) audio signal out the speaker while capturing the integrated microphone signal. There were no in-room signals played or captured other than the speaker output and ambient room noise. Echo cancellation performance was assessed by capturing the raw microphone signal with no echo processing 902. The ordinates for all graphs is measured processed microphone signal strength relative to full-scale (−1 [−31,768 integer value] to 1 [32,767 integer value] independent of signal encoding format representing any measured analog signal range; for example but not limited to −5 volts (−1) to +5 volts (1) of a 16-bit PCM signal (−32,768 to +32,767 integer value range out of a total of 65,536 integer values) plotted versus time. The analog signal range and units are a function of the analog to digital & digital to analog conversion process and are not directly represented in the graphs. Capturing the microphone signal using only the primary echo canceller 903. Capturing the microphone signal with the primary echo canceller working in combination with a current art second stage echo reduction algorithm 904. Capturing the microphone signal utilizing one embodiment of the invention where the estimated speaker echo signal 512 is provided to the second stage echo reduction processor 704 improving performance by over 4.5 dB 905 as measured in the described test environment.

The embodiments described in this application have been presented with respect to use in one or more conference rooms preferably with local and remote multi users. However, the present invention may also find applicability in other environments such as: 1. Commercial transit passenger and crew cabins such as, but not limited to, aircraft, busses, trains and boats. All of these commercial applications can be outfitted with microphones and speakers which can benefit from consistent microphone audio signal quality with minimal echo signal conditions which can vary from moderate to considerable; 2. Private transportation such as cars, truck, and mini vans, where command and control applications and voice communication applications are becoming more prominent; 3. Industrial applications such as manufacturing floors, warehouses, hospitals, and retail outlets to allow for audio monitoring and to facilitate employee communications without having to use specific portable devices; and 4. Drive through windows and similar applications, where ambient sounds levels can be quite high and variable, can be controlled to consistent levels within the scope of the invention. Also, the processing described above may be carried out in one or more devices, one or more servers, cloud servers, etc.

The individual components shown in outline or designated by blocks in the attached Drawings are all well-known in the electronic processing arts, and their specific construction and operation are not critical to the operation or best mode for carrying out the invention.

While the present invention has been described with respect to what is presently considered to be the preferred embodiments, it is to be understood that the invention is not limited to the disclosed embodiments. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An apparatus providing enhanced echo suppression in a conferencing system having at least one microphone and at least one speaker, comprising:
    at least one primary echo-suppressor configured to receive at least one microphone input signal from the at least one microphone and at least one speaker input signal from the at least one speaker, and configured to produce at least one echo estimate signal and at least one echo-suppressed microphone signal; and
    at least one secondary echo-suppressor configured to receive the at least one echo-suppressed microphone signal and one or more selected from a group consisting of the at least one echo estimate signal and the at least one microphone input signal, and configured to produce an echo-processed microphone signal.

2. The apparatus of claim 1 wherein the at least one secondary echo-suppressor is configured to produce the echo-processed microphone signal without using the at least one speaker input signal.

3. The apparatus of claim 1 wherein the at least one primary echo-suppressor comprises an echo estimate processor configured to:
    receive the at least one speaker input signal and the at least one microphone input signal; and
    produce the at least one echo estimate signal.

4. The apparatus of claim 1 wherein the at least one primary echo-suppressor is configured to produce the at least one echo-suppressed microphone signal by subtracting the at least one echo estimate signal from the at least one microphone input signal.

5. The apparatus of claim 1 wherein the at least one secondary echo-suppressor is configured to:
    receive the at least one echo estimate signal and the at least one echo-suppressed microphone signal;
    produce at least one estimate of residual echo signal based on the at least one echo estimate signal; and
    produce the echo-processed microphone signal by subtracting the at least one estimate of residual echo signal from the at least one echo-suppressed microphone signal.

6. The apparatus of claim 1 wherein the at least one secondary echo-suppressor is configured to:
    receive the at least one echo-suppressed microphone signal and the at least one microphone input signal;
    subtract the at least one echo-suppressed microphone signal from the at least one microphone input signal to produce at least one approximation speaker echo estimate signal;
    produce at least one estimate of residual echo signal based on the at least one approximation speaker echo estimate signal; and
    produce the echo-processed microphone signal by subtracting the at least one estimate of residual echo signal from the at least one echo-suppressed microphone signal.

7. The apparatus of claim 1 wherein the at least one primary echo-suppressor uses a room transfer function to provide the at least one echo estimate signal.

8. A method of providing enhanced echo suppression in a conferencing system having at least one microphone and at least one speaker, comprising:
    receiving at least one microphone input signal from the at least one microphone;
    receiving at least one speaker input signal from the at least one speaker via at least one primary echo-suppressor;
    producing at least one echo estimate signal and at least one echo-suppressed microphone signal based on the at least one microphone input signal and the at least one speaker input signal via the at least one primary echo-suppressor; and
    producing an echo-processed microphone signal via at least one secondary echo-suppressor based on the at least one echo-suppressed microphone signal and one or more selected from a group consisting of the at least one echo estimate signal and the at least one microphone input signal.

9. The method of claim 8 wherein the at least one secondary echo-suppressor is configured to produce the echo-processed microphone signal without using the at least one speaker input signal.

10. The method of claim 8 wherein the at least one echo estimate signal is produced based on the at least one microphone input signal and the at least one speaker input signal via the at least one primary echo-suppressor.

11. The method of claim 8 wherein the at least one echo-suppressed microphone signal is produced based on the at least one echo estimate signal and the at least one microphone input signal via the at least one primary echo-suppressor.

12. The method of claim 8 wherein said producing an echo-processed microphone signal comprises:
    receiving the at least one echo estimate signal and the at least one echo-suppressed microphone signal via the at least one secondary echo-suppressor;
    producing at least one estimate of residual echo signal based on the at least one echo estimate signal; and
    producing the echo-processed microphone signal by subtracting the at least one estimate of residual echo signal from the at least one echo-suppressed microphone signal.

13. The method of claim 8 wherein said producing an echo-processed microphone signal comprises:
    receiving the at least one echo-suppressed microphone signal and the at least one microphone input signal via the at least one secondary echo-suppressor;

subtracting the at least one echo-suppressed microphone signal from the at least one microphone input signal to produce at least one approximation speaker echo estimate signal;

producing at least one estimate of residual echo signal based on the at least one approximation speaker echo estimate signal; and producing the echo-processed microphone signal by subtracting the at least one estimate of residual echo signal from the at least one echo-suppressed microphone signal.

14. A non-transitory computer readable media that includes a program code for providing enhanced echo suppression in a conferencing system having at least one microphone and at least one speaker, said program code comprising instructions causing at least one processor, which comprises at least one primary echo-suppressor and at least one secondary echo-suppressor, to perform:

receiving at least one microphone input signal from the at least one microphone;

receiving at least one speaker input signal from the at least one speaker via the at least one primary echo-suppressor;

producing at least one echo estimate signal and at least one echo-suppressed microphone signal based on the at least one microphone input signal and the at least one speaker input signal via the at least one primary echo-suppressor; and producing an echo-processed microphone signal via the at least one secondary echo-suppressor based on the at least one echo-suppressed microphone signal and one or more selected from a group consisting of the at least one echo estimate signal and the at least one microphone input signal.

15. The non-transitory computer readable media of claim 14 wherein the at least one secondary echo-suppressor is configured to produce the echo-processed microphone signal without using the at least one speaker input signal.

16. The non-transitory computer readable media of claim 14 wherein the at least one echo estimate signal is produced based on the at least one microphone input signal and the at least one speaker input signal via the at least one primary echo-suppressor.

17. The non-transitory computer readable media of claim 14 wherein the at least one echo-suppressed microphone signal is produced based on the at least one echo estimate signal and the at least one microphone input signal via the at least one primary echo-suppressor.

18. The non-transitory computer readable media of claim 14 wherein the at least one secondary echo-suppressor is configured to:

receive the at least one echo estimate signal and the at least one echo-suppressed microphone signal;

produce at least one estimate of residual echo signal based on the at least one echo estimate signal; and produce the echo-processed microphone signal by subtracting the at least one estimate of residual echo signal from the at least one echo-suppressed microphone signal.

19. The non-transitory computer readable media of claim 14 wherein the at least one secondary echo-suppressor is configured to:

receive the at least one echo-suppressed microphone signal and the at least one microphone input signal;

subtract the at least one echo-suppressed microphone signal from the at least one microphone input signal to produce at least one approximation speaker echo estimate signal;

produce at least one estimate of residual echo signal based on the at least one approximation speaker echo estimate signal; and produce the echo-processed microphone signal by subtracting the at least one estimate of residual echo signal from the at least one echo-suppressed microphone signal.

* * * * *